(12) United States Patent
Yokomichi et al.

(10) Patent No.: US 6,276,232 B1
(45) Date of Patent: Aug. 21, 2001

(54) STROKE LENGTH REGULATOR

(75) Inventors: Manabu Yokomichi; Eiichi Nagayama, both of Higashimurayama (JP)

(73) Assignee: Nikkiso Company Limited, Tokyo (JP)

( * ) Notice: Subject to any disclaimer, the term of this patent is extended or adjusted under 35 U.S.C. 154(b) by 0 days.

(21) Appl. No.: 09/402,672

(22) PCT Filed: Apr. 9, 1998

(86) PCT No.: PCT/JP98/01635

§ 371 Date: Jan. 13, 2000

§ 102(e) Date: Jan. 13, 2000

(87) PCT Pub. No.: WO98/45620

PCT Pub. Date: Oct. 15, 1998

(30) Foreign Application Priority Data

Apr. 9, 1997 (JP) ........................................ 9-91171

(51) Int. Cl.$^7$ ........................ F16H 53/00; F16C 11/00
(52) U.S. Cl. ..................... 74/567; 74/568 R; 74/44; 74/571 R; 74/595; 74/600; 74/602
(58) Field of Search ................ 74/567–569, 595, 74/600, 44, 570, 571 R, 571 L, 571 M, 602

(56) References Cited

U.S. PATENT DOCUMENTS

| 3,106,105 | * | 10/1963 | Booth | ........................ | 74/571 |
| 3,927,574 | * | 12/1975 | Rice | ........................ | 74/567 X |
| 3,974,715 | * | 8/1976 | Habiger | ........................ | 74/600 X |
| 4,355,545 | * | 10/1982 | Ross | ........................ | 74/567 |
| 4,665,650 | * | 5/1987 | Hall | ........................ | 49/334 |
| 4,730,511 | * | 3/1988 | Tsujimura | ........................ | 74/567 |
| 5,667,283 | * | 9/1997 | Drennen et al. | ........................ | 74/567 X |

FOREIGN PATENT DOCUMENTS

| 0 437 664 A1 | * | 7/1991 | (EP) | ........................ | 74/567 |
| 38-22756 | * | 10/1963 | (JP) | ........................ | 74/567 |
| 50-31962 | * | 10/1975 | (JP) | ........................ | 74/567 |
| 4-92148 | * | 3/1992 | (JP) | ........................ | 74/567 |
| WO 92/10338 | * | 11/1991 | (WO) | ........................ | 74/595 |

* cited by examiner

*Primary Examiner*—Vinh T. Luong
(74) *Attorney, Agent, or Firm*—Browdy and Neimark

(57) ABSTRACT

A stroke length regulator of small dimensions and simple construction, provided with a cam for converting an eccentric movement into a reciprocating movement, a cylindrical body around which this cam is fitted, and a crank member fitted slidably in this cylindrical body and having a cam guide portion for varying an eccentric position of the cam and an outer circumferential surface portion contacting an inner circumferential surface of the cylindrical body.

4 Claims, 15 Drawing Sheets

STROKE LENGTH REGULATOR

FIELD OF THE INVENTION

This invention relates to a stroke length adjusting device, more particularly to a small-sized stroke length adjusting device, which has a rigidity more improved as compared with conventional adjusting devices, is easily manufactured and reduced an excess of torque occurred to be crank.

BACKGROUND OF THE INVENTION

As one of conventional stroke length adjusting devices may be raised a stroke length adjusting device disclosed in JP Examined Publication No. 47-33812. This stroke length adjusting device is one "which comprises eccentric shaft 1 rotated by a driving member, a member to be reciprocated by the eccentric shaft 1 connecting to the member, and an adjusting member allowing the eccentric shaft 1 to travel along the central axis XX' thereof, characterized in that said eccentric shaft 1 is provided with rotators 52 and 53, on which is mounted inclined shaft 51 in such a manner that both cross each other at a predetermined tilt angle θ between the central axis PP' of the inclined shaft 1 and the central axis of the rotators 52 and 53, and a cam 2 is provided, which has hole 54 made therein so as to have said tilt angle to the central axis XX' of said rotators 52 and 53' and mate said inclined shaft 51, whereby said cam 2 is mounted through said hole 54 on said inclined shaft 51 at an angle rectangular to said central axis XX', thus said cam 2 allowing a connecting bar 3 to reciprocate and then said eccentric shaft 1 to travel in the direction of said central axis XX' thereof, so that the stroke length can arbitrarily be regulated regardless of whether it is operated or not".

To be summarized, the above-mentioned stroke length adjusting device is constituted by providing the eccentric shaft 1 between the rotators 52 and 53, which is inclined at a predetermined angle to the central axes of the rotators 52 and 53 and tightly inserted into the hole 54 provided in the cam 2. The up-and-down movement of the rotators 52 and 53 allows the eccentric point of the cam to be changed. The connecting bar connected to the eccentrically rotated cam can be reciprocated at an arbitrarily changed stroke length by adjusting the positions in the vertical direction of the rotators 52 and 53. The two rotators are sustained by respective cylindrical holders in such a manner that the former are mated into the latter.

However, the conventional stoke length adjusting device above has such problems as mentioned below:

(1) A load via the cam is transmitted to the rotators bound to both the ends of the eccentric shaft and then onto the cylindrical holders, in which the rotators are mated. Therefore, in order to transfer the load on the rotators to the holders, the height of the cylindrical rotators is necessary to be made larger. Furthermore, the rotators goes up and down as the eccentric shaft rises up and descends down to change the stroke length of the reciprocated connecting bar. As a result, the thick rotators move up and down at a longer distance, which makes the cylindrical rotator holders longer;

(2) Since a lubricant must be supplied to all the load-burdened positions, lubricant-supplying impellers are required at such positions;

(3) Since a large amount of the lubricant is required, an excess of the lubricant supplied may run out when the rotators are raised up;

(4) Since the structure of the two rotators between which the eccentric shaft is mounted is complicated, the fabrication or assembly thereof requires a large amount of work load;

(5) When the eccentric shaft is raised up and fallen down, a torque is burdened onto a cylindrical worm wheal in which the rotators are inserted to rotate them, and the torque-burdened position is changed as the position of the eccentric shat is moved; and (6) Since the load applied to the cam causes components of a force to be produced on the eccentric shaft in the vertical direction thereof, a shim adjustment is required at the rotator holders to inhibit the force components in the vertical direction.

Therefore, the conventional stroke length adjusting device is complicated in the structure thereof and hence cannot be made in a small size.

The object of this invention is to solve these problems. Another object of this invention is to provide a stroke length adjusting device having a simple structure. A further object of this invention is to provide a smaller-sized stroke length adjusting device as compared with the conventional one. A still further object of this invention is to provide a stroke length adjusting device comprising a less amount of constituting elements to more easily be assembled. An additional object of this invention is to provide a sound stroke length adjusting device having an adequate strength to withstand the torque generated by the movement of the cam.

DISCLOSURE OF THE INVENTION

According to this invention, to solve the problems above, the means of this invention is a stroke length adjusting device characterized in that it is provided with a cylindrical body formed so as to be able to rotate with a rotation-driving means and rotatably held by a sustaining means, a crank member mated into the cylindrical body so as to travel in the direction of the central axis of the cylindrical body by a reciprocation-driving means, a cam mounted on the crank member in the direction rectangular to the central axis of the crank member, and a movement-converting means for converting the eccentric rotation to the reciprocation of the cam, the crank member being inclined at a predetermined tilt angle against the central axis of the cylindrical body, thereby allowing the cam to eccentrically move as the crank member travels along the central axis of the cylindrical body and, therefore, provided with a groove-shaped cam-guiding part and further with an outer circumferential surface contacting the inner circumferential surface of the cylindrical body, and the cam being mounted at the outside of the cylindrical body in the direction rectangular to the central axis of the cylindrical body, and provided with a part to be guided by the cam-guiding part.

In a preferred embodiment of this invention, there is provided a stroke length adjusting device, characterized in that it is provided with a cylindrical body formed so as to be able to rotate with a rotation-driving means and rotatably held by a sustaining means, a crank member mated into the cylindrical body so as to travel in the direction of the central axis of the cylindrical body by a reciprocation-driving means, a cam mounted on the crank member, and a movement-converting means for converting the eccentric rotation to the reciprocation of the cam, the crank member comprising a first recess having a first slope inclined at a predetermined angle against the central axis of the cylindrical body and an inner wall surface facing the first slope, a second recess having a second slope inclined at the same predetermined angle but formed back-to-back with the first slope and an inner wall surface facing the second slope, and an outer circumferential surface sliding on the inner surface of the cylindrical body, the cylindrical body comprising an inner circumferential surface contacting the outer circumferential surface of the crank member, a first opening having the same width as that of the first recess and facing the first recess, and a second opening having the same width as that of the second recess and facing the second recess, and the cam being provided with a first projection inserted into the first opening in a mated state and having a slope end surface slidable on the first slope and a second projection inserted into the second opening in a mated state and having a slope end surface slidable on the second slope, and the cam being mounted at the outside of the cylindrical body.

In another preferred embodiment of this invention, there is provided a stroke length adjusting device, characterized in that It is provided with a cylindrical body formed so as to be able to rotate with a rotation-driving means and rotatably held by a sustaining means, a crank member mated into the cylindrical body so as to travel in the direction of the central axis of the cylindrical body by a reciprocation-driving means, a cam mounted on the crank member in the direction rectangular to the central axis of the crank member, and a movement-converting means for converting the eccentric rotation to the reciprocation of the cam.

the crank member being provided with a pair of first outer circumferential surfaces slidable on the inner circumference surface of the cylindrical body and formed to be positioned in directions opposite to each other, a pair of bases having flat surfaces formed parallel to each other between the pair of the first outer circumferential surfaces, second outer circumferential surfaces sliding on the inner surface of the cylindrical body and formed at the respective flat surfaces in a pair, and a pair of projections having a first sliding slope inclined at a predetermined angle against the central axis of the cylindrical body, and a second sliding slope inclined at the same predetermined angle as above and formed back-to-back with the first sliding slopes, the cylindrical body being provided with the inner circumferential surface formed to allow the first and second outer circumferential surfaces to slide thereon, and a pair of a first opening and second opening having the same width as that of the flat surfaces, and the cam being inserted in a tightly mated state into the first opening at the outside of the cylindrical body, and having a first groove formed to allow the pair of the projections to slide in the cylindrical body as the crank member travels and a second groove formed to allow the bases of the crank member eccentrically rotating as the cylindrical body rotates to move.

In a further embodiment of this invention, there is provided a stroke length adjusting device, characterized in that it is provided with a cylindrical body formed so as to be able to rotate with a rotation-driving means and rotatably held by a sustaining means, a crank member mated into the cylindrical body so as to travel in the direction of the central axis of the cylindrical body by a reciprocation-driving means, a cam mounted on the crank member in the direction rectangular to the central axis of the crank member, and a movement-converting means for converting the eccentric rotation to the reciprocation of the cam, the crank member being a cylindrical rod having an outer circumferential surface on which a first groove is formed to slant at a predetermined angle to the central axis of the cylindrical body and a second groove is formed back-to-back with the first groove, the outer circumferential surface slidably contacting the inner circumferential surface of the cylindrical body, the cylindrical body having the inner circumferential surface contacting the outer circumferential surface of the crank member, and having a first opening and second opening formed so that the cam can be mounted, and the cam being mounted by inserting it at the outside of the cylindrical body into the first opening and then into the second opening in a mated state, and the cam having a first projection formed thereon so as to be mated in the first groove and a second projection so as to be mated in the second groove.

BEST MODES FOR REDUCING THIS INVENTION TO PRACTICE

Example 1

Firstly, an example of this invention will be illustrated below with reference to the drawings.

Figure 1:
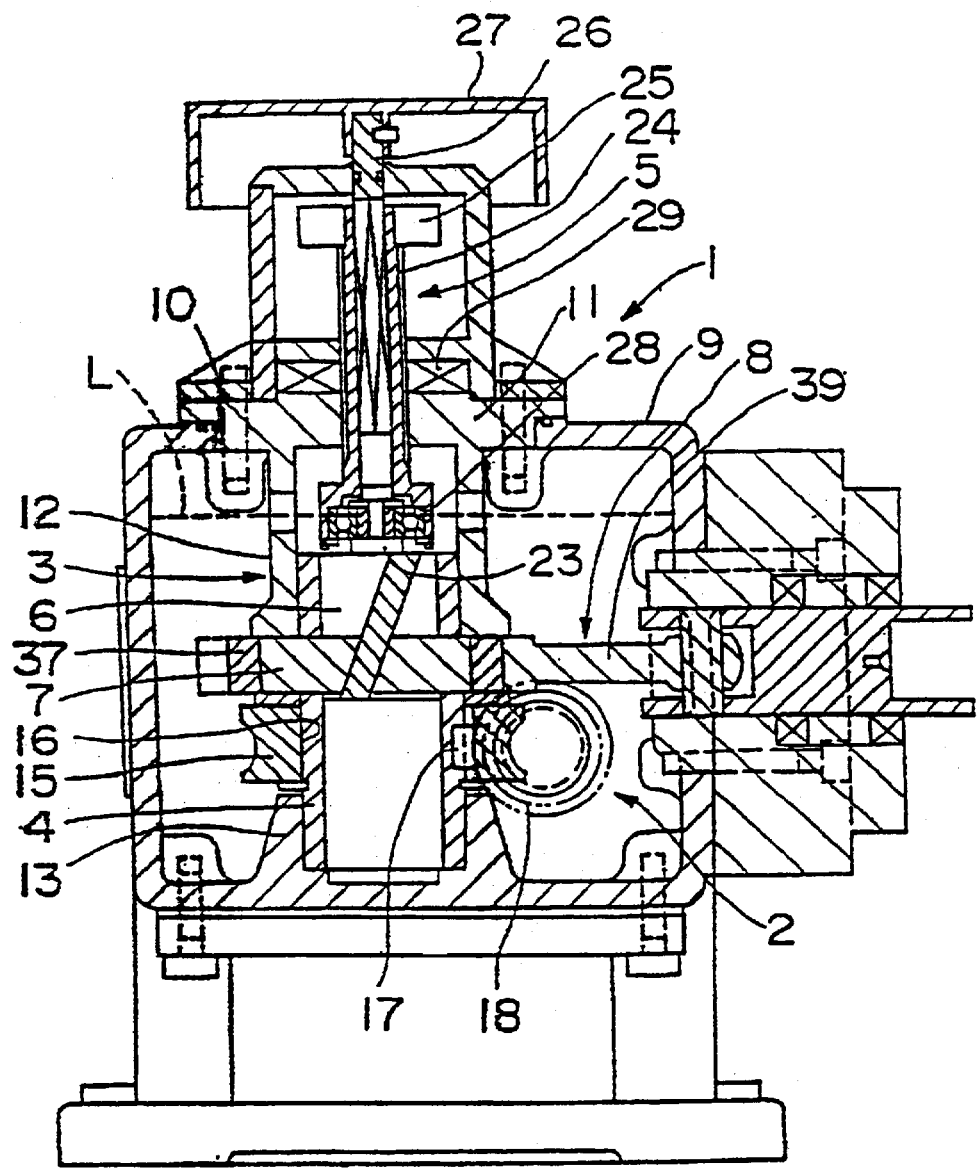
FIG. 1 is a vertical cross-sectional view of an example of the stroke length adjusting device according to this invention.

As shown in FIG. 1, stroke length adjusting device 1 as an example of this invention is assembled to comprise:

cylindrical body 4 which can be driven by the aid of rotation-driving means 2 sustained by holding means 3, crank member 6 which can be moved up and down by the aid of up-and-down movement-driving means 5 as an example of a reciprocation-driving means, cam 7 mounted on crank member 6 at a right angle to the direction of the central axis of the crank member, and power-transmitting means 8 for transmitting the rotation of cam 7 to the reciprocation.

The cylindrical body 4 is placed in oil-reservoir 9 capable of storing a lubricant by rotatably mating the upper part of the body in cylindrical sleeve 12, which is made on the lower side of lid 11 mated in opening 10 on the upper side of the container 9, and rotatably mating the lower part of the body in cylindrical installing means 13 mounted on the bottom of the oil-reservoir 9. The lubricant is filled up to a level of dotted line L as shown in FIG. 1. The combination of the sleeve 12 and installing means 13 is an example of a means for rotatably setting up the cylindrical body in the oil-reservoir 9.

The length of the cylindrical body 4 is designed in such a manner that the crank member 6, which will be described below, may be contained in the cylindrical body even when it moves by the aid of the up-and-down movement-driving means 5 both to the bottom dead point and top dead point. Presence of the crank member 6 in the cylindrical body allows the cylindrical body 4 to receive the load or torque by the crank member 6, so that the load or torque may be dispersed.

Figure 2:
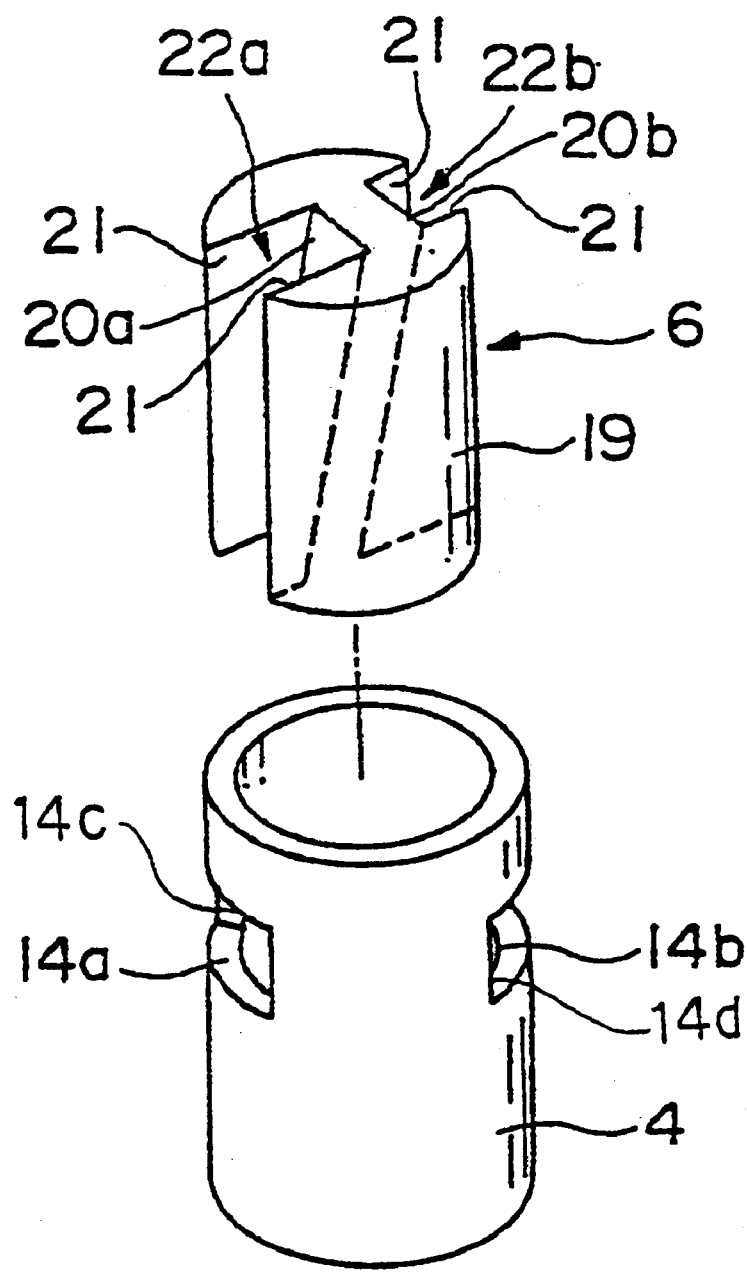
FIG. 2 is a pictorial view of a first example of the cylindrical body and the crank member of the stroke length adjusting device according to this invention.

As shown in FIG. 2, two openings are formed at the middle part of the cylindrical body 4 so as that these openings are located at the opposite sides facing each other. These openings are referred to as first opening 14$a$ and second opening 14$b$, respectively. These openings 14$a$ and 14$b$ both have a rectangular shape in a front view. As described below, these openings 14$a$ and 14$b$ have a part of the cam 7 inserted therein.

As shown in FIG. 1. the cylindrical body 4 is provided at the lower part thereof with worm wheel 15. The worm wheel 15 has a cylindrical body-mounting circular hole 16 in which the cylindrical body 4 can be mated. The lower part of the cylindrical body 4 is mated in the mounting circular hole 16. The cylindrical body 4 is provided on the lower surface thereof with key 17, which allows the cylindrical body to rotate as the worm wheel 15 rotates. The worm wheel 15 is provided on the outer circumferential surface thereof with teeth, which mate with the worm shaft 18 connected to the rotating shaft of a driving means such as a motor (not shown). Therefore, the cylindrical body 4 rotates as the motor is driven.

In this example, the sleeve 12 and installing means 13 in the oil-reservoir 9 correspond to the holding means referred to in this invention, to support the cylindrical body 4 in a rotatable state. Furthermore, a series of the motor, worm shaft 18 and worm wheel 15 for transmitting the rotating force of the driving means to the cylindrical body 4 correspond to the rotation-driving means referred to in this invention.

The crank member 6 is placed in the cylindrical body 4 in a mated state. As shown in FIG. 2, the crank member 6 is comprised of outer surface 19 formed to be slidable on the inner surface of the cylindrical body 4, which is part of the outer surface of a cylindrical rod which is coaxial with the cylindrical body 4, first recess 22a cut out in a groove shape on the side surface of the cylindrical rod from one end to the other end of the cylindrical rod, which recess is comprised of a first slope 22a as a bottom wall inclined at a predetermined angle to the central axis of the cylindrical rod and a pair of inner walls 21 facing each other, and second recess 22b cut out back-to-back with the first slope 22a, which recess is comprised of a second slope 22b as a bottom wall inclined at the same angle as that of the first slope and a pair of inner walls 21 facing each other. The part between the first slope 22a and the second slope 22b may be referred to as an eccentric shaft.

In this example, the first recess 22a and second recess 2b correspond to the cam-guiding means referred to in this invention. The side wall 14c of the first opening 14a and the side wall 14d of the second opening 14b function as rotation force-transmitting faces for transmitting the rotation force of the crank member 6 rotating as the cylindrical body 4 rotates about the central axis thereof, to the cam 7. The first slope 20a and second slope 22b function as cam-travelling force-transmitting faces for transmitting the cam eccentric force by reciprocation of the crank member 6 in the cylindrical body 4 to the cam 7.

In other words, the crank member 6 is comprised of a cylindrical rod slidable on the inner surface of the cylindrical body and having the first recess 22a and second recess 22b cut out on the side surface thereof in a groove shape back-to-back with each other.

The up-and-down movement-driving means 5 allows the crank member 6 to reciprocate through the cylindrical body 4 along the central axis thereof.

As shown in FIG. 1, the up-and down movement-driving means 5 is provided with shaft 23, leading screw 24, plug 25, bar 26 and handle 27. The shaft 23 is set up on the upper end of the crank member 6 comprised of a rod provided on the side surface with grooves, so that the central axis of the shaft 23 may comply with that of the crank member 6. The shaft is provided on the upper circumference thereof with bearing 28. The cylindrical leading screw 24 has a thread provided on the outer circumference thereof. The thread is screw-mated with the thread groove formed on lid 11. Turn stopper 29 is provided on the upper side of the lid 11. The leading screw 24 opens at the bottom thereof. In this opening is inserted the top of the shaft 23 in such a manner that the shaft 23 can rotate about the central axis thereof through the bearing 28. The plug 25 is mounted on the upper end of the cylindrical leading screw 24. The bar 26 is connected to the top of the plug 25. The grip 27 is mounted on the top of the bar 26, which bar rotatably penetrates through the top opening of a cylinder with a bottom provided on the lid 11, thereby closing the top opening.

In the up-and-down movement-driving means 5, the leading screw 24 screw-mated with the lid 11 rotates as the rotation is given to the handle 27. The cylindrical leading screw 24 rises up or descends down depending on the direction of rotation of the handle 27. Since the shaft 23 is mounted on the bottom of the leading screw 24, the crank member 6 goes up and down in the body 4 as the leading screw 24 goes up and down. Since the shaft 23 is rotatably mounted via the bearing 28 on the lower part of the leading screw 24, the rotation of the crank member 4 about the central axis thereof allows the leading screw 24 and grip 27 not to rotate, i.e., to be kept as they stand.

Figure 3:
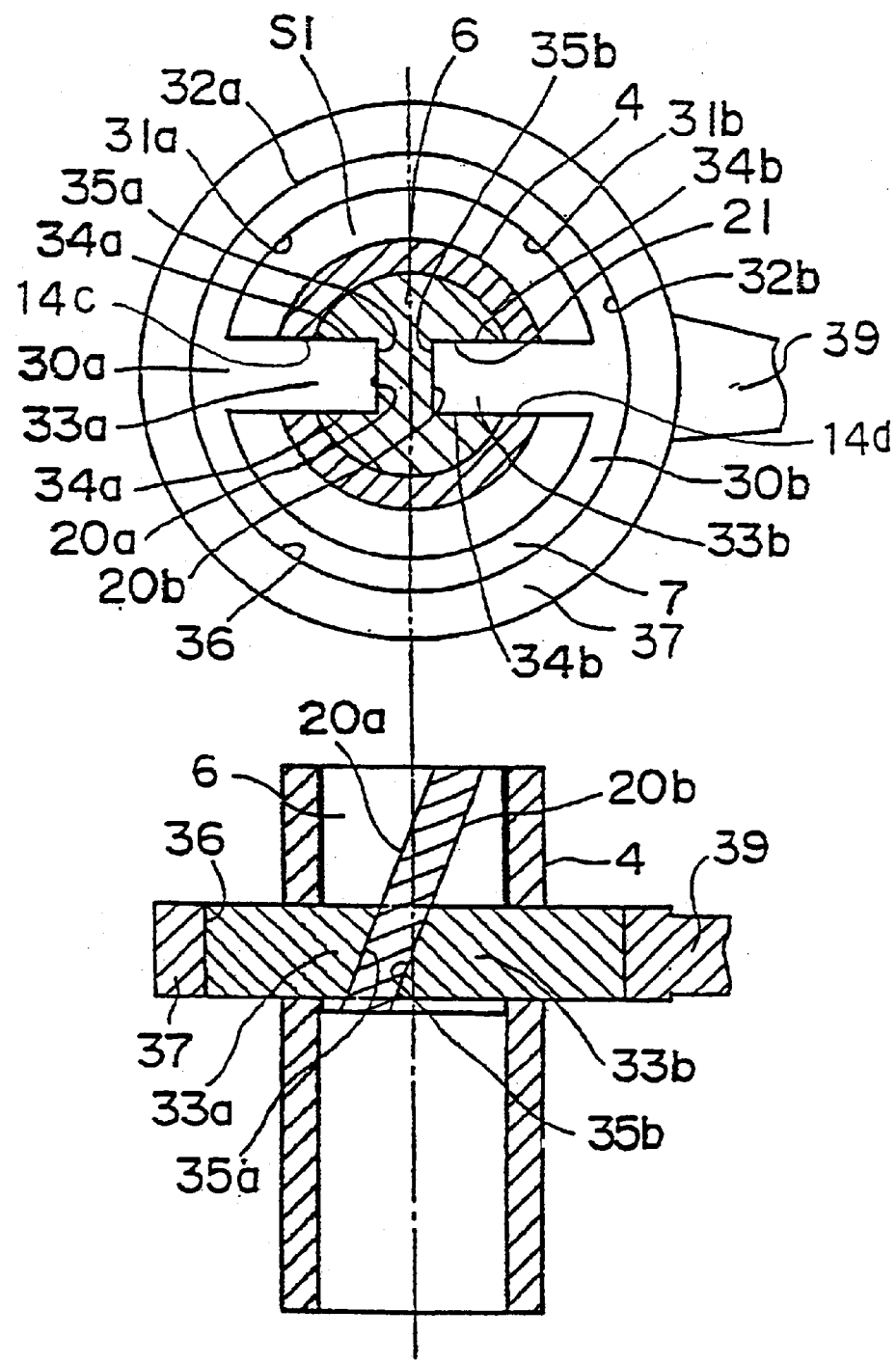
FIG. 3 is a view illustrating a combination of the cylindrical body, crank member and cam in the first example of the stroke length adjusting device of this invention, in which the stroke length is in a state of 0%.

As shown in FIG. 3, the cam 7 is comprised of first cam element 30a and second cam element 30b.

The first cam element 30a is comprised of first inner surface 31a, which constitutes part of a circle formed when brought into contact with the second cam element 30b and having a larger diameter than that of the cylindrical body 4, first outer surface 32a corresponding to the first inner surface 31a, and first projection 33a mated with the first opening 14a and first recess 22a. The first projection 33a is comprised of a pair of first sides allowing the side wall 14c of the first opening to slide on the sides, and first slope end surface 35a allowing the first slope 22a to slide thereon. Therefore, the first slope end surface 35a is also inclined at the same angle as that of the first slope 20a.

The second cam element 30b is comprised of second inner surface 31b, which constitutes part of a circle formed when brought into contact with the first cam element 30a and having a larger diameter than that of the cylindrical body 4, second outer surface 32b corresponding to the second inner surface 31b, and second projection 33b mated with the second opening 14b and second recess 22b. The second projection 33b is comprised of a pair of second sides allowing the side wall 14d of the second opening to slide on the sides, and second slope end surface 35b allowing the second slope 22b to slide thereon. Therefore, the second slope end surface 35b is also inclined at the same angle as that of the second slope 20b.

When the first cam 30a and second cam 30b are brought into contact with each other so that the first projection 33a and second projection 33b may face each other, the first inner surface 31a and second inner surface 31b constitute part of a circle, and the outer surface of the first cam element 30a and the outer circumferential surface of the second cam element 30b constitute part of a circle.

When the first cam element 30a is mounted in such a manner that the first projection 33a is inserted into the first opening 14a of the cylindrical body 4 containing the crank member 6 placed therein and the first side 34a is brought into contact with the inner surface of the cylindrical body 4, the first slope end surface 35a of the first projection 33a contacts the first slope 22a of the first recess 22a, and both the sides of the first projection 33a contact the first opening side walls 14c. Furthermore, when the second cam element 30b is mounted in such a manner that the second projection 33b is inserted into the second opening 14b of the cylindrical body 4 containing the crank member 6 placed therein and the second side 34b is brought into contact with the inner surface of the cylindrical body 4, the second slope end surface 35b of the second projection 33b contacts the second slope 22b of the first recess 22a, and both the sides of the second projection 33b contact the second opening side walls 14d.

Mounting the cam 7 In the crank member 6 mounted in the cylindrical body 4 forms space S1 between the outer circumference of the cylindrical body 4 and the first inner surface 31a/second inner surface 31b. The space S1 allows the cam 7 to eccentrically rotate as the cylindrical body 4 rotates. In other words, the space S1 allows the cam 7 comprised of the first cam element 30a and second cam element 30b to eccentrically rotate at the position of the crank member 6 as raised up and descended down.

In the example above, the first projection 33a and second projection 33b are guided by the first recess 22a and second recess 22b to travel in a direction rectangular to the central axis of the cylindrical body 4 as the crank member 6 is moving. These projections mean parts to be guided in this invention.

The power-transmitting means 8 acts to convert the eccentric rotation of the cam 7 to reciprocation. In this example, as shown in FIGS. 1 and 3, the power-transmitting means 8 Is constituted by mounting member 37 having circular mounting hole 36 for mounting the cam 7, and connecting bar 39 connected to a piston (not shown) inserted in a cylinder (not shown). The cam 7 is rotatably mated with the mounting member 37.

Then, the function of the thus assembled stroke length adjusting device 1 will be described below.

The stroke length adjusting device 1 allows the stroke length to be adjusted without any steps from 0% to 100%, regardless of whether the adjusting device is stopped or operated. This is because the total amount of the eccentricity of the crank member 6 and the cam 7 can vary from 0% to 100% depending the up-and-down reciprocation of the crank member 6.

FIGS. 1 and 3 show a state of the adjusting device in a stoke of 0%. In FIG. 1, the crank member 6 reached the top position (top dead point). Then, driving of a motor (not shown) allows the worm shaft 18 to rotate, and also the worm wheel 15 to rotate, the worm shaft being provided with teeth for mating the worm shaft 18. The worm wheel 15 and cylindrical body 4 are connected by key 17 and, hence, the cylindrical body 4 can also rotate as the worm wheel 15 rotates. Since the first projection 33a is inserted in the first opening 14a of the cylindrical body 4, and the second projection 33b in the second opening 14b, the cam 7 rotates as the cylindrical body 4 rotates. Rotation of the cam 7 allows the eccentric shaft formed between the first slope 22a and second slope 22b to eccentrically rotate, and the cam 7 also to eccentrically rotate. Then, the eccentricity of the eccentric shaft and the eccentricity of the cam 7 offset each other, so that the total of them is zero(0), and the center of the cam 7 and the center of the eccentric shaft comply with each other, so that the stroke length of a piston connected to the connecting bar 39 may be zero(0).

Figure 4:
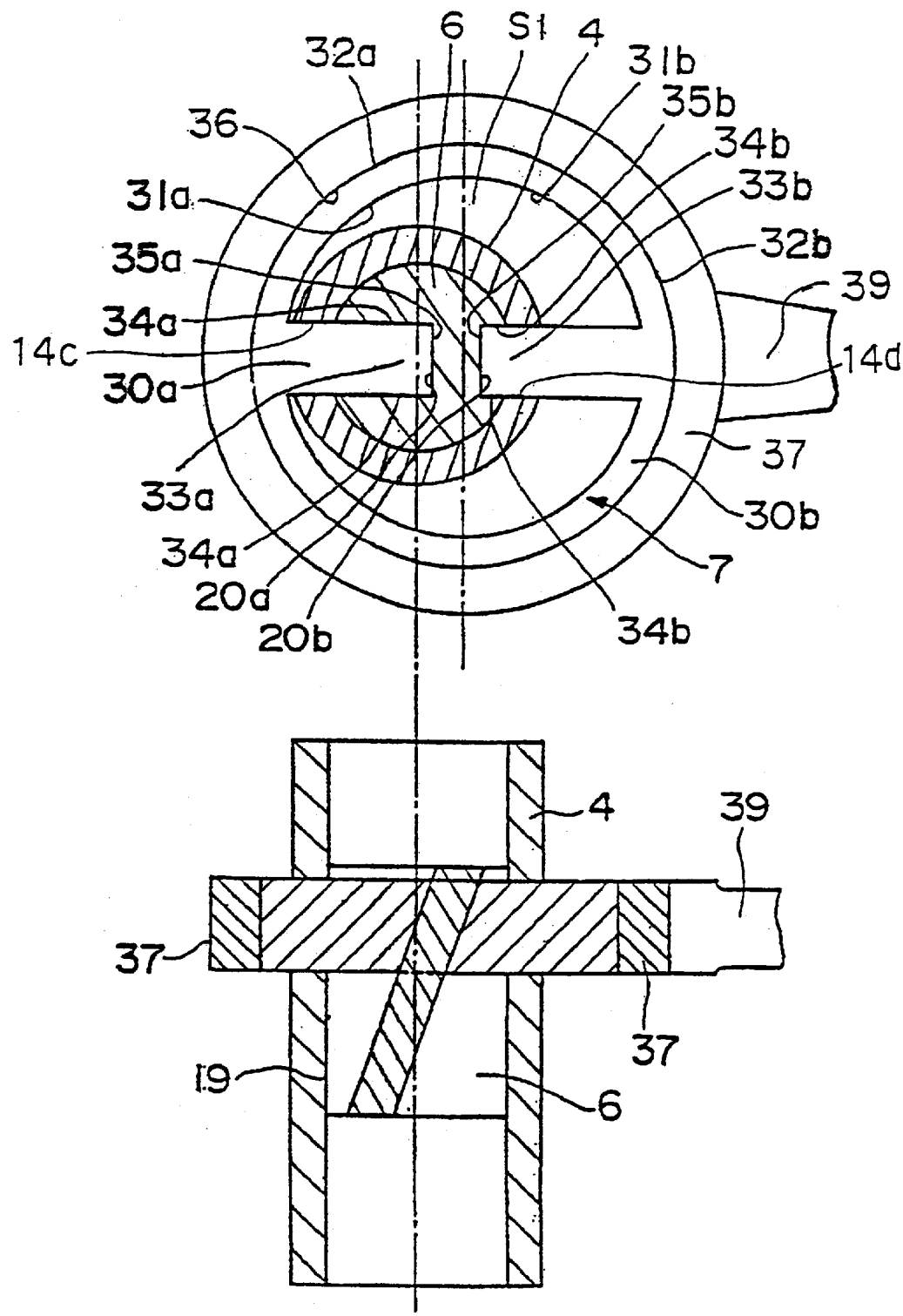
FIG. 4 is a view illustrating a combination of the cylindrical body, crank member and cam in the first example of the stroke length adjusting device of this invention, in which the stroke length is in a state of 100%.

FIG. 4 shows a state of the adjusting device in a stoke of 100%. In FIG. 4, the crank member 6 positions at the lowest point (bottom dead point). The up-and-down movement of the crank member 6 may be carried out by the up-and-down movement-driving means 5. In this state, driving of a motor (not shown) allows the worm shaft 18 to rotate and also the worm wheel 15 to rotate, the worm shaft being provided with teeth for mating the worm shaft 18 . The worm wheel 15 and cylindrical body 4 are connected by key 17 and, hence, the cylindrical body 4 can also rotate as the worm wheel 15 rotates Since the first projection 33a is inserted in the first opening 14a of the cylindrical body 4, and the second projection 33b in the second opening 14b, the cam 7 rotates as the cylindrical body 4 rotates. Rotation of the cam 7 allows the eccentric shaft to eccentrically rotate, and the cam 7 also to eccentrically rotate. Then, the sum of the eccentricity of the eccentric shaft and the eccentricity of the cam 7 becomes an eccentric rotation radius, so that the stroke length of a piston connected to the connecting bar 39 may be 100%.

Therefore, when the crank member 6 is allowed to rise up and descend down by the up-and-down movement-driving means 5, the stroke of piston 38 connected to one end of the connecting bar 39 can arbitrarily be regulated within the range of 0% to 100% by changing the position of the cam 7 on the eccentric shaft.

Then, in the stroke length adjusting device 1, a load transmitted via the cam 7 compulsorily rotated by rotation of the eccentric shaft linked to the rotation of the crank member 6 Is transmitted via the outer surface 19 to the cylindrical body 4. The load transmitted to the cylindrical body 4 is divided to the sleeve 12 and installing means 13.

A conventional stroke length adjusting device is provided with an N-shaped crank having a first rotor, second rotor and cylindrical eccentric shaft sloped between the first and second rotors. The load from the eccentric shaft transmits via the first rotor to one of supporting means for the first rotor, and via the second rotor to a worm wheel. This is received by an installing means (or sleeve). Therefore, the conventional installing means or sleeve must be large-sized so that the two supporting means may withstand the load. On the other hand, however, according to this invention, the load from the cam 7 is divided over the whole of the adjusting device. Therefore, the sleeve 12 and installing means 13 do not have to be made in a large size. In other words, the stroke length adjusting device 1 of this invention can be made in a small size.

Since the load from the cam 7 transmits via the outer surface 19 of the crank member 6 to the cylindrical body 4, the conventional first and second rotors are not required. Therefore, the height of the stroke length adjusting device of this invention can be made lower.

Since the outer surface 19 of the crank member 6 slides on the inner surface of the cylindrical body 4 in its rotation, the force couple generated by the eccentric rotation of the eccentric shaft is divided to the cylindrical body 4. Therefore, the torque is not concentrated to the particular means and hence the stroke length adjusting device 1 of this example has a less amount of troubles.

In the stroke length adjusting device 1 of this example, the load from the crank member 6 is applied to the inner surface of the cylindrical body 4, even if the position of the crank member 6 is changed by up-and-down movement of the crank member 6. The cylindrical body 4 itself receives the divided load from the crank member 6. Therefore, in the stroke length adjusting device 1 of this example, the load is not supported by the rotor-supporting means only, which is different from the conventional stroke length adjusting device. Thus, the stroke length adjusting device 1 has a smaller load-receiving area than that of the conventional stroke length adjusting device. From this point of view, the stroke length adjusting device 1 can be made smaller In this example, the shape of the first slope 22a and second slope 22b is such that the slopes appear as straight lines rectangular to the inner walls 21 facing each other on the cross section of the crank member 6 rectangular to the central axis thereof. However, the shape of the first slope and second slope is not limited to such a shape as mentioned above. The slope may have any shape that allows the first projection 33a of the cam 7 to be mated with the first recess 22a and first opening 14a, the second projection 33b of the cam 7 to be mated with the second recess 22b and second opening 14b, the rotation force of the cylindrical body 4 rotating about the central axis thereof to transmit to the cam 7 through the first recess 22a and second recess 22b, and the cam 7 to eccentrically rotate as the crank member 6 travels in the cylindrical body 4, and that allows the first projection 33a to slide In the first recess 22a and the second projection 33b to slide in the second recess 22b. The shape of the first slope 22a and second slope 20b meeting the requirements as mentioned above may be shown in FIGS. 5 to 10.

FIGS. 5 to 10 are cross-sectional views of the slopes when the crank member 6 was cut in a direction rectangular to the central axis thereof.

Figure 5:
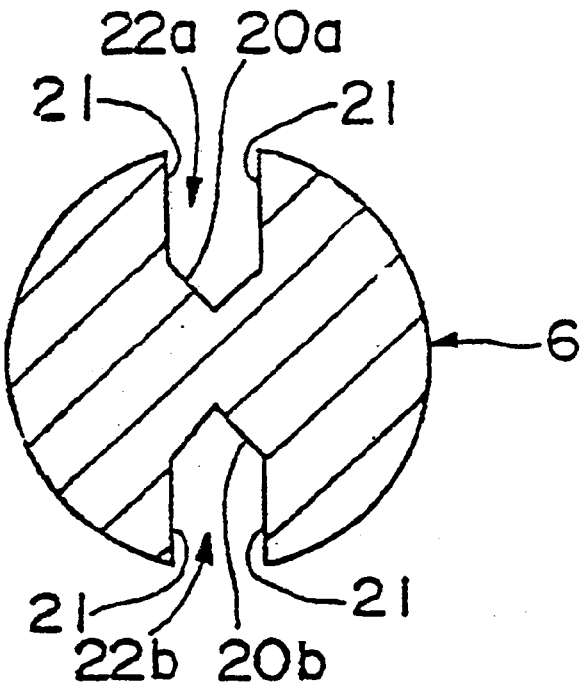
FIG. 5 is a cross-sectional view of another example of the crank member in an example of the stroke length adjusting device of this invention.

In the crank member 6 as shown in FIG. 5, the first slope 20a and second slope 22b are in a V-shape gradually narrowed in the direction to the central axis of the crank member 6. Therefore, the first slope end of the first projection of the cam to be mated with the first recess 22*a* constituted by the first slope 22*a* and the parallel inner walls 21 facing each other, is also in the same V-shape and slidable on the first slope 20*a*. Similarly, the second slope end of the second projection of the cam to be mated with the second recess 22*b* constituted by the second slope 22*b* and the parallel inner walls 21 facing each other, is also in the same V-shape and slidable on the first slope 20*b*.

Figure 6:
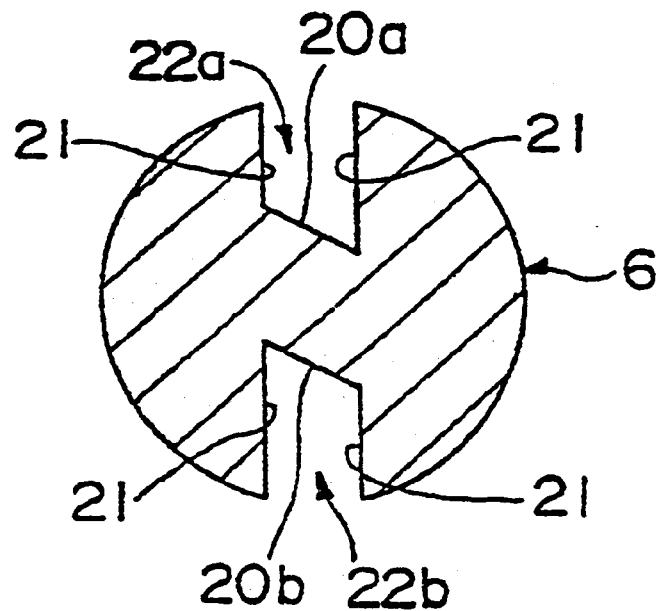
FIG. 6 is a cross-sectional view of a further example of the crank member in an example of the stroke length adjusting device of this invention.

In the crank member 6 as shown in FIG. 6, the first slope 20*a* and second slope 22*b* are inclined at a predetermined angle to the parallel inner walls 21 facing each other and being present both at the sides of the respective slopes. Both the slopes are parallel to each other in the cross-sectional view of the crank member 6. That is, the first slope end of the first projection of the cam to be mated with the first recess 22*a* constituted by the first slope 22*a* and the parallel inner walls 21 facing each other, has a slope cut obliquely to the inner walls 21 and is slidable on the first slope 22*a*. Similarly, the second slope end of the second projection of the cam to be mated with the second recess 22*b* constituted by the second slope 20*b* and the parallel inner walls 21 facing each other, has a slope cut obliquely to the inner walls 21 and is slidable on the second slope 20*b*.

Figure 7:
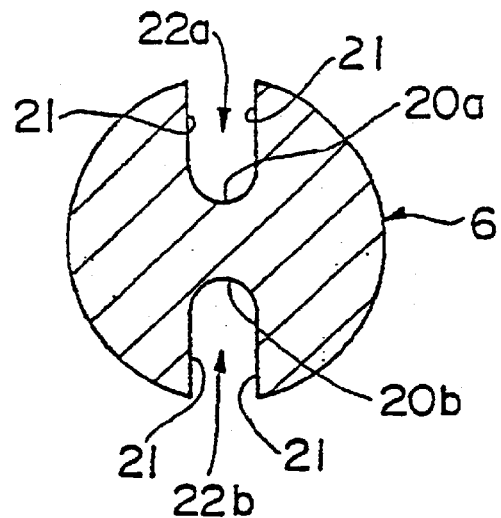
FIG. 7 is a cross-sectional view of a still further example of the crank member in an example of the stroke length adjusting device of this invention.

In the crank member 6 as shown in FIG. 7, the first slope 20*a* and second slope 22*b* are in a U-shape indented in the direction to the central axis of the crank member 6. Therefore, the first slope end of the first projection of the cam to be mated with the first recess 22*a* constituted by the first slope 20*a* and the parallel inner walls 21 facing each other, is also in a U-shape projected in the direction to the central axis and slidable on the first slope 22*a*. Similarly, the second slope end of the second projection of the cam to be mated with the first recess 22*b* constituted by the first slope 22*b* and the parallel inner walls 21 facing each other, is also in a U-shape projected in the direction to the central axis and slidable on the second slope 20*b*.

Figure 8:
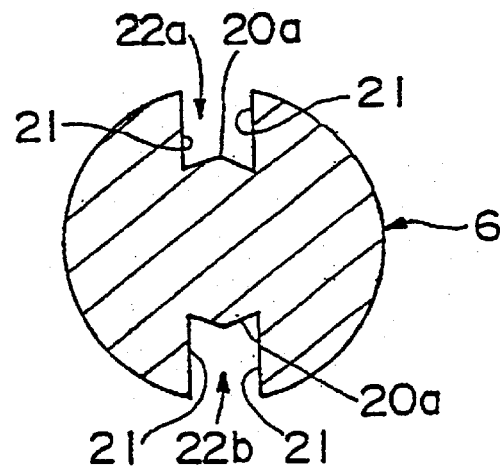
FIG. 8 is also a cross-sectional view of a still further example of the crank member in an example of the stroke length adjusting device of this invention.

In the crank member 6 as shown in FIG. 8, the first slope 20*a* and second slope 20*b* are in an M-shape as viewed in the direction to the central axis of the crank member 6. Therefore, the first slope end of the first projection of the cam to be mated with the first recess 22*a* constituted by the first slope 20*a* and the parallel inner walls 21 facing each other, is in a V-shape as viewed in the direction to the central axis of the crank member 6 and slidable on the first slope 22*a*. Similarly, the second slope end of the second projection of the cam to be mated with the first recess 22*b* constituted by the first slope 20*b* and the parallel inner walls 21 facing each other, is in a V-shape as viewed in the direction to the central axis of the crank member 6 and slidable on the first slope 20*b*.

Figure 9:
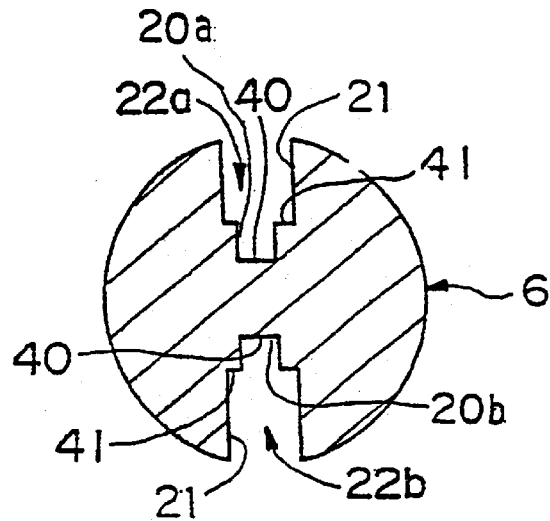
FIG. 9 is also a cross-sectional view of a still further example of the crank member in an example of the stroke length adjusting device of this invention.

In the crank member 6 as shown in FIG. 9, the first slope 20*a* and second slope 22*b* are in such a shape that groove 40 indented as viewed in the direction to the central axis of the crank member 6 and steps 41 between the groove 40 and the respective inner walls 21 are given to the slopes. Therefore, the first slope end of the first projection of the cam to be mated with the first recess 22*a* constituted by the first slope 20*a* and the parallel inner walls 21 facing each other, is also in such a shape that a narrower projection is projected on the slope end in the direction to the central axis, and slidable on the first slope 22*a*. Similarly, the second slope end of the second projection of the cam to be mated with the second recess 22*b* constituted by the second slope and the parallel inner walls 21 facing each other, is also in such a shape that a narrower projection is projected on the slope end in the direction to the central axis, and slidable on the second slope.

Figure 10:
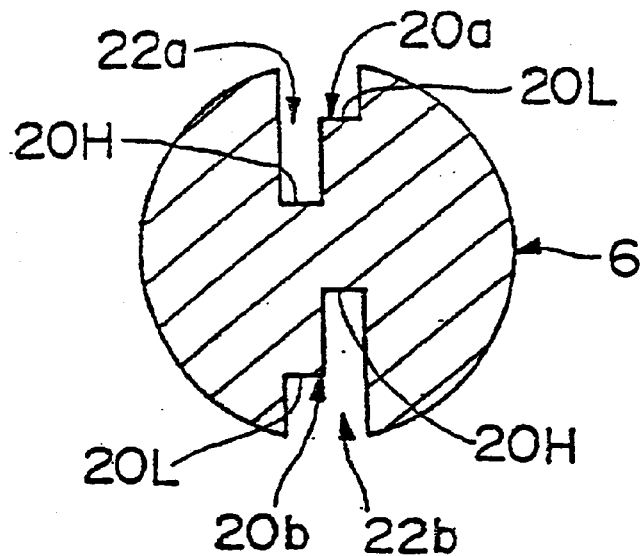
FIG. 10 is also a cross-sectional view of a still further example of the crank member in an example of the stroke length adjusting device of this invention.

In the crank member 6 as shown in FIG. 10, the first slope 20*a* and second slope 22*b* have a two-stepped slope of a shallow part 20L and deep part 20H as viewed in the direction to the central axis of the crank member 6. Therefore, the first slope end of the first projection of the cam to be mated with the first recess 22*a* constituted by the first slope 22*a* and the parallel inner walls 21 facing each other, is in a two-stepped projected shape as viewed in the direction to the central axis and slidable on the first slope 22*a*. Similarly, the second slope end of the second projection of the cam to be mated with the second recess 22*b* constituted by the second slope and the parallel inner walls 21 facing each other, is in a two-stepped projected shape as viewed in the direction to the central axis and slidable on the second slope.

In any of the modifications above, the first recess and second recess act as a cam guide for guiding the first projection and second projection, and the first projection and second projection are to be guided.

Example 2

The stroke length adjusting device of Example 2 is different from that of Example 1 with respect to the cylindrical body 4, crank member 6 and cam 7.

Figure 11:
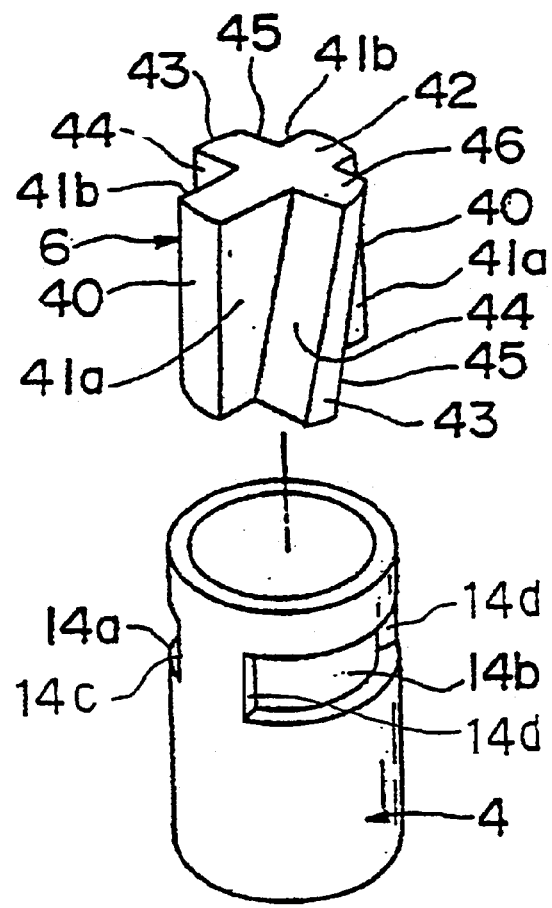
FIG. 11 is a pictorial view of the cylindrical body and crank member in a second example of the stroke length adjusting device of this invention.

As shown in FIG. 11, the cylindrical body 4 of this example is different from that of Example 1 with respect to the shape of the first opening 14*a* and second opening 14*b*. The first opening 14*a* and second opening 14*b* of the cylindrical body 4 in Example 1 are identical in a function for mounting the cam with the first opening 14*a* and second opening 14*b* of the cylindrical body 4 in Example 2. Therefore, the shape and size of the first opening 14*a* and second opening 14*b* vary depending upon the structure and size of the cam. The shape and size of the first opening 14*a* and second opening 14*b* will be described with reference to the cam.

As shown in FIG. 11, the crank member 6 in Example 2 is provided with base 42, which is slidable on the inner surface of the cylindrical body 4 and has a pair of first outer surfaces 40, 40 on the opposite sides of the base and a pair of flat surfaces 41*a*, 41*b* parallel to each other between the first outer surfaces 40. 40, and a pair of projections 46, 46, which are projected on the pair of the flat surfaces 41*a*, 41*b*, respectively, and have second outer surfaces 43, 43, first sliding slope 44 slated at a predetermined angle to the central axis of the cylindrical body 4 and second sliding slope 45 inclined at the same angle as mentioned above and formed back-to-back with the first sliding slope 44.

In a cross-sectional view of the crank member 6 on a plane rectangular to the central axis of the crank member, the edge line of the first outer surface 41*a* of the base 42 is rectangular to the edge line of the first sliding slope 44 of the projection 46, and the edge line of the first outer surface 41*b* of the base 42 is rectangular to the edge line of the second sliding slope 45 of the projection 46. Therefore, the end surfaces of the crank member are in a cross shape as viewed in the axial direction thereof.

The pair of projections 46, 46 extend in the opposite directions to each other with respect to the base 42. The first sliding slope 44 of one of the projections 46 is positioned back-to-back with the second sliding slope 45. These slopes are parallel to each other. Similarly, the first sliding slope 44 of the other of the projections 46 is positioned back-to-back with the second sliding slope 45. These slopes are parallel to each other. The first sliding slope 44 of one of the projections 46 has the same angle of slope as that of the first sliding slope of the other of the projections 46. These slopes are on the same plane. Similarly, the second sliding slope 45 of one of the projections 46 has the same angle of slope as that of the second sliding slope of the other of the projections 46. These slopes are on the same plane.

The first outer circumferential surfaces 40, 40 and the second outer surfaces 43, 43 are part of the outer surface of the cylindrical rod sliding on the inner surface of the cylindrical body 4.

When the crank member 6 is mated in the cylindrical body 4, the first outer surfaces 40, 40 and the second outer surfaces 43, 43 slide on the inner surface of the rotated cylindrical body 4 The side walls of the first opening 14c and the side walls of the second opening 14d transmit the force of rotation to the cam. Furthermore, when the crank member 6 travels along the central axis thereof in the cylindrical body 4, the projection 46 having the first sliding slope 44 and second sliding slope 45 allow the central axis of the cam 7 to be made eccentric.

In this example, the first outer surfaces 40, 40 and second outer surfaces 43, 43 correspond to the outer surface referred to in this invention. The projections 46 correspond to the cam-guiding means referred to in this invention. In other words, the first sliding slope 44 and second sliding slope 45 correspond to the cam-guiding means referred to in this invention.

In this example, the crank member 6 is provided with the up-and-down movement-driving means 5 for allowing the crank member 6 to go up and down, as in Example 1. The up-and-down movement-driving means 5 corresponds to the reciprocation-driving means referred to in this invention.

Figure 12:
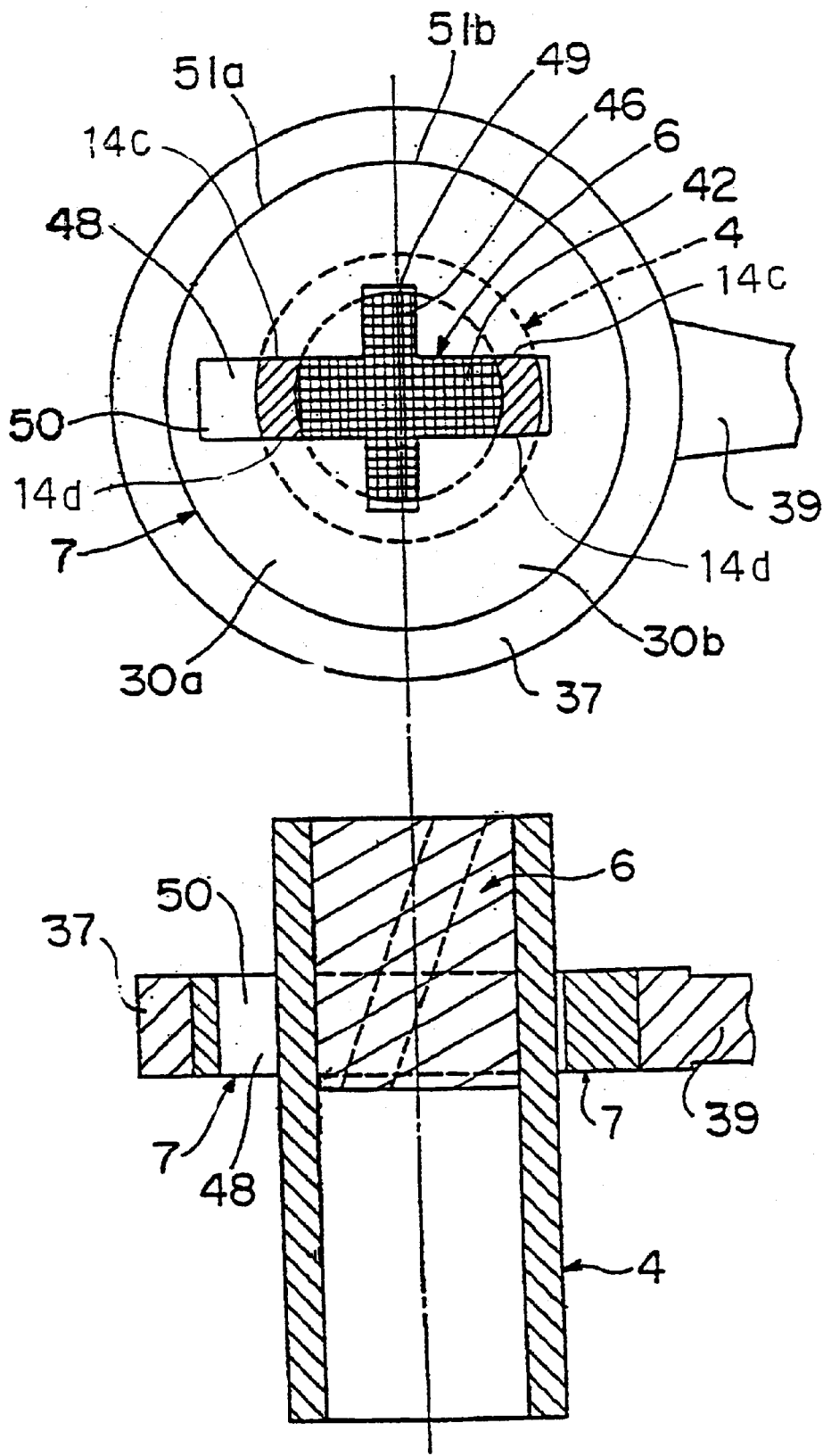
FIG. 12 is a view illustrating a combination of the cylindrical body, crank member and cam in the second example of the stroke length adjusting device of this invention, in which the stroke length is in a state of 0%.
Figure 13:
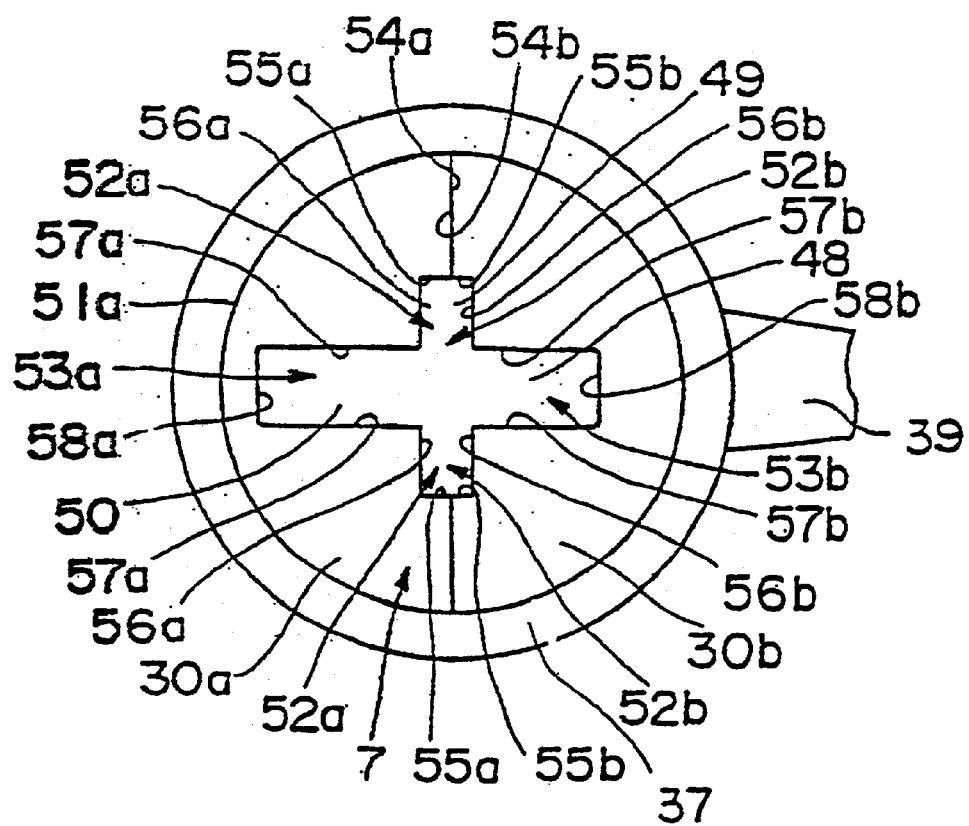
FIG. 13 is a plan view of the cam in the second example of the stroke length adjusting device of this invention.
Figure 14:
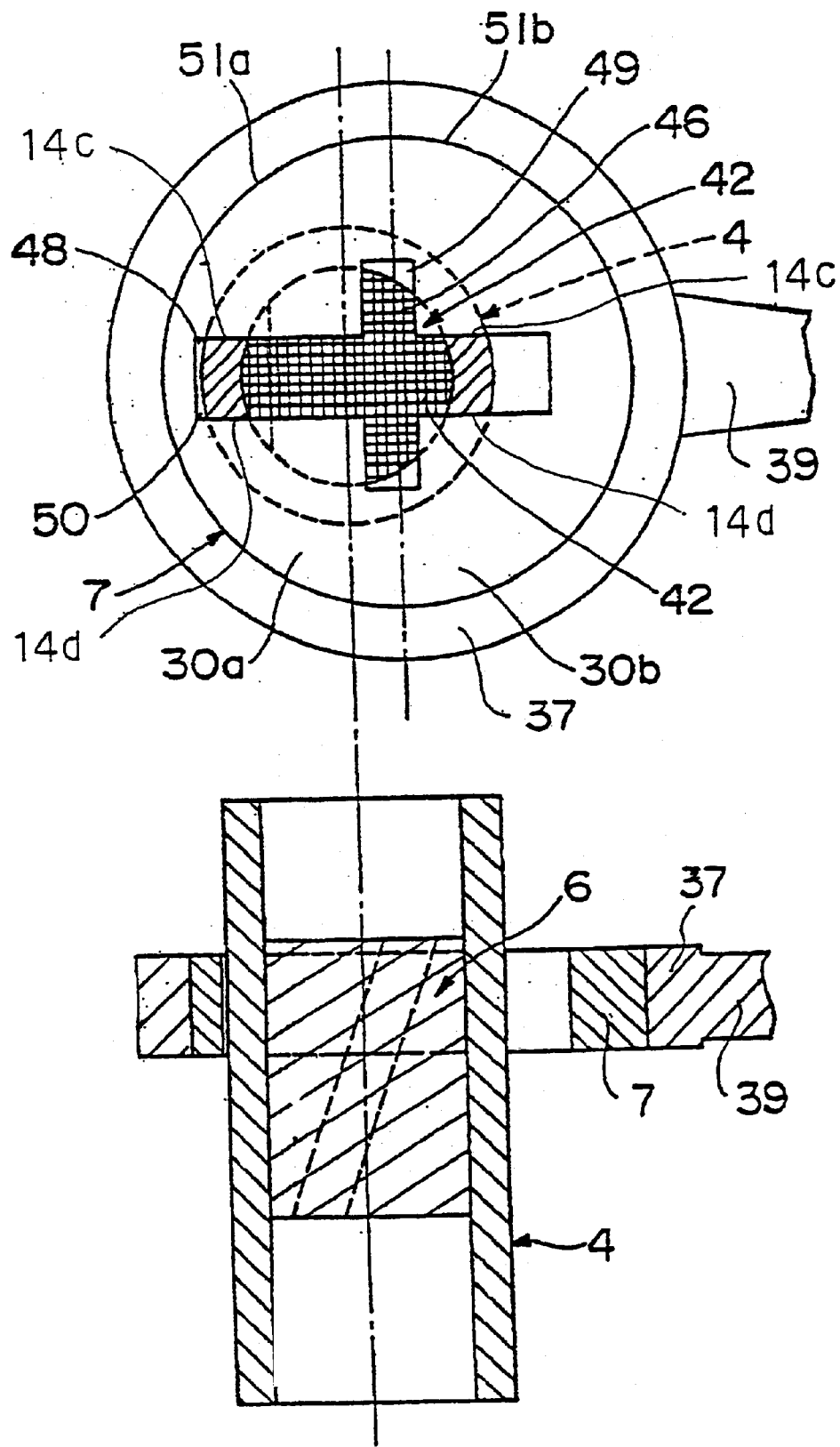
FIG. 14 is a view illustrating an assembly of the cylindrical body, crank member and cam in the second example of the stroke length adjusting device of this invention, in which the stroke length is in a state of 100%.

In this example, the cam 7 is comprised of the first cam element 30a and second cam element 30b, as shown in FIGS. 12, 13 and 14. The cam comprised of the first cam element 30a and second cam element 30b integrated together is a disk having opening 48 in a cross shape provided at the center of the cam.

The opening 48 of the disk cam 7 is constituted by first groove 49 allowing the pair of projections 46 to slide therethrough as the crank member 6 travels in the cylindrical body 4, and second groove 50 allowing the base 42 of the crank member 6 to slide and reciprocate therethrough as the crank member 6 rotates together with the cylindrical body 4.

The first cam element 30a is a semi-disk having a cutout for forming the first groove 49 and second groove 50 and provided with first semicircular circumference 51a, first cutout for forming the first groove 52a and first cutout for forming the second groove 53a.

More particularly, the first cam element 30a is provided with the first semicircular circumference 51a having a semicircular outer surface and capable of forming a circle together with the second cam element 30b, a pair of first contact surfaces 54a constituted by surfaces formed in the direction to the center of the circle from both the ends of the first semicircular circumference 51a to the edges appearing at a distance from both the ends of the first semicircular circumference 51a, first rectangular small surfaces 55a formed by cutting out at a right angle at each of the ends of the first contact surfaces 54a (the opposite ends correspond to the ends of the semicircular circumnferences), a pair of first slopes 56a extending from the first rectangular small surfaces 55a in a direction parallel to the direction of the first contact surfaces 54a, the ends of which appear at a distance from the ends of the first rectangular small surfaces 55a, and sloped at the same angle as that of the first sliding slope and second sliding slope, a pair of first rectangular large surfaces 57a formed in a flat surface by cutting out in the direction rectangular to the first slope 56a and extending from the ends of the first slopes 56a to positions near the semicircle, and first bottom surface 58a formed in a flat surface between the ends of the first rectangular large surfaces 57a. The first rectangular small surface 55a and first slope 56a form first cutout for forming the first groove 52a, and the first rectangular large surface 57a and first bottom surface 58a form first cutout for forming the second groove 53a.

On the other hand, the second cam element 30b is provided with the second semicircular circumference 51b having a semicircular outer circumferential surface and capable of forming a circle together with the first cam element 30a, a pair of second contact surfaces 54b constituted by surfaces formed in the direction to the center of the circle from both the ends of the second semicircular circumference 51b to the edges appearing at a distance from both the ends of the second semicircular circumference 51b, second rectangular small surfaces 55b formed by cutting out at a right angle at each of the ends of the second contact surfaces 54b (the opposite ends correspond to the ends of the semicircular circumferences), a pair of second slopes 56b extending from the second rectangular small surfaces 55b in a direction parallel to the direction of the second contact surfaces 54b, the ends of which appear at a distance from the ends of the second rectangular small surfaces 55b, and sloped at the same angle as that of the first sliding slope and second sliding slope, a pair of second rectangular large surfaces 57b formed in a flat surface by cutting out in the direction rectangular to the second slope 56b and extending from the ends of the second slopes 56b to positions near the semicircle, and second bottom surface 58b formed in a flat surface between the ends of the second rectangular large surfaces 57b.

The second rectangular small surface 55b and second slope 56b form first cutout for forming the second groove 52b, and the second rectangular large surface 57b and second bottom surface 58 form second cutout for forming the second groove 53b.

The first cam element 30a and second cam element 30b are joined by mating the first contact surface 54a and the second contact surface 54b to form a circular outer circumference comprised of the first semicircular circumference 51a and the second semicircular circumference 51b, thereby resulting in the formation of the first groove 49 from the first cutout 52a for forming the first groove and the second cutout 52b for forming the first groove, and in the formation of the second groove 50 from the first cutout 53a for forming the second groove and the second cutout 53b for forming the second groove. The first groove 49 is slidably mated with the projection 46 of the crank member 6, and the second groove 50 is slidably mated with the base 42 of the crank member 6. Therefore, the sizes of the first rectangular small surfaces 55a and second rectangular small surfaces 55b, the first slope 56a and second slope 56b, the first rectangular large surfaces 57a and second rectangular large surfaces 57b, and the first bottom surface 58a and second bottom surface 58b are so determined that the projection 46 may be slidably mated with the first groove 49, and the second groove 50 may be slidably mated with the base 42.

The cam 7 is mounted in the cylindrical body 4. Therefore, in the case where the cam 7 is formed by bringing the first cam element 30a into contact with the second cam element 30b, the first opening 14a and second opening 14b are formed on the side surface of the cylindrical body 4, so that the first rectangular large surface 57a and second rectangular large surface 57b may be positioned in the cylindrical body 4. The thickness of the first opening 14a and second opening 14b is adjusted to be sufficient to insert the cam 7 into the openings, and the width of the first opening 14a and second opening 14b is so adjusted that the base 42 of the crank member 6 may be put between the first rectangular large surface 57a and second rectangular large surface 57b.

The cam 7 is provided with a movement-converting means for converting the eccentric rotation of the cam to reciprocation, which means is constituted by a mounting means having a round opening for mounting the cam and a connecting bar connected to a piston mated in a cylinder, as described in Example 1.

In this example, as described In Example 1, rotation of the worm wheel in which the cylindrical body 4 is mated allows the rotator to rotate. The rotation of the rotator allows the crank member 6 to rotate. Eccentric rotation of the crank member 6 set at a predetermined position by allowing it to move up and down by the up-and-down movement-driving means 5 allows the cam to eccentrically rotate. Thus, the stroke length of piston 38 of the movement-converting means 8 is regulated depending upon the position of the crank member 6.

Then, the same function as in Example 1 was made, so that the load was dispersed, and the stroke length Adjusting device 1 was made in a small size. FIG. 14 shows the stroke length Adjusting device of Example 2 in such a state that the stroke length is 100%, and FIG. 12 in such a state that the stroke length is 0%.

The projections 46 of the crank member 6 in Example 2 are constituted by parallel first sliding slopes 44 and parallel second sliding slopes 45 and circumferential surfaces 43 between the edges of the parallel sliding slopes. These projections guide the eccentricity of the cam and are satisfied when the rotation force of the drank member 6 Is transmitted to the cam. For example, the lines of the end of the projections appearing on the plane formed by cutting out the crank member at its central axis may be in a shape such as an M-shape, V-shape, U-shape or square recess-shape.

Figure 20:
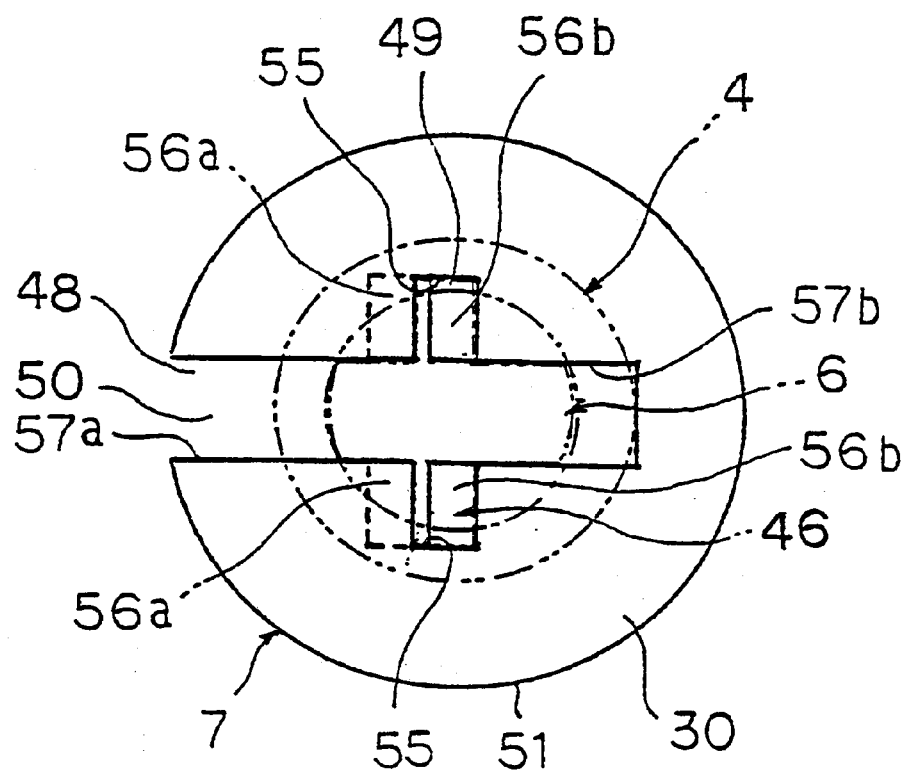
FIG. 20 is a plan view of another example of the cam used in the second example of the stroke length adjusting device of this invention.

In the stroke length Adjusting device as shown in FIG. 2, the end of the second groove 50 in the cam 7 as shown in FIGS. 12 to 14 may be opened at the circumference of the cam 7. This type of the cam 7 is shown in FIG. 20. When the same reference numbers as those in FIG. 12 to 14 are used in FIG. 20, they indicate the same things, if not specified otherwise.

The cam 7 as shown in FIG. 20 has a cam element 30 which is a disc having cross-shaped opening 48 at the center thereof.

The opening 48 of the cam element 30 is constituted by first groove 49, which is formed in the same manner that the first groove 49 is formed in the cam 7 as shown in FIGS. 12 to 14, and second groove 50 passing through the center of the cam element 30 and crossing the first groove 49 at a right angle.

In the cam element 30 as shown in FIG. 20, the first groove is provided at both the ends thereof with rectangular small surface 55 crossing the first slope 56a and second slope 56b both at a right angle. One end of the second groove 50 opens at the circumference of the cam element 30, and the other end is bottom surface face 58 parallel to the axis of the cam element 30. The ends of the first rectangular large surfaces 57a in a pair at the opposite sides of the second groove, forming the part between the first slope 56a and the outer circumference of the cam element 30, connect with circumference 51 of the cam element 30

In the cam 7 as shown In FIG. 20, the cylindrical body 4 can be inserted by inserting the part having the first opening 14a and second opening 14b into the cam 7 from the opening of the second groove along the second groove. Therefore, the assembly in this example is easier that of the stroke length Adjusting devices in FIGS. 12 to 14.

Example 3

The stroke length adjusting device of Example 3 is different in the cylindrical body, crank member and cam from that of Example 1.

Figure 15:
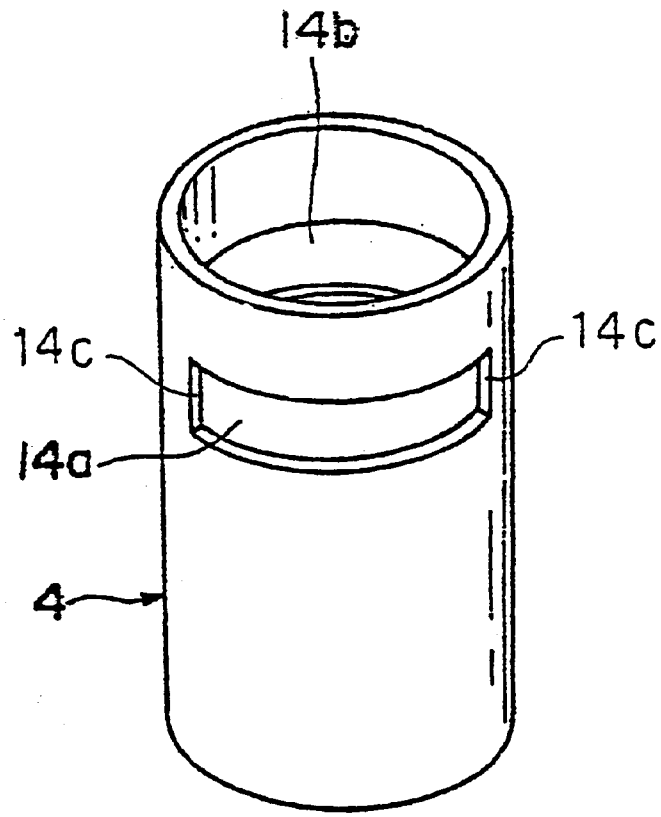
FIG. 15 is a pictorial view of the cylindrical body mounted in a third example of the stroke length adjusting device of this invention.

As shown in FIG. 15, the cylindrical body of this example is different in the shape of the first opening 14a and second opening 14b from that of Example 1. The first opening 14a and second opening 14b of the cylindrical body 4 in Example 1, and the first opening 14a and second opening 14b of the cylindrical body 4 in Example 3 both function as parts for placing the cam in the cylindrical body 4 and then combining with the crank member. Therefore, the shape and size of the first opening 14a and second opening 14b vary depending upon the structure and shape of the cam and the crank member. The shape and size of the first opening 14a and second opening 14b in Example 3 will be illustrated with reference to the cam.

Figure 16:
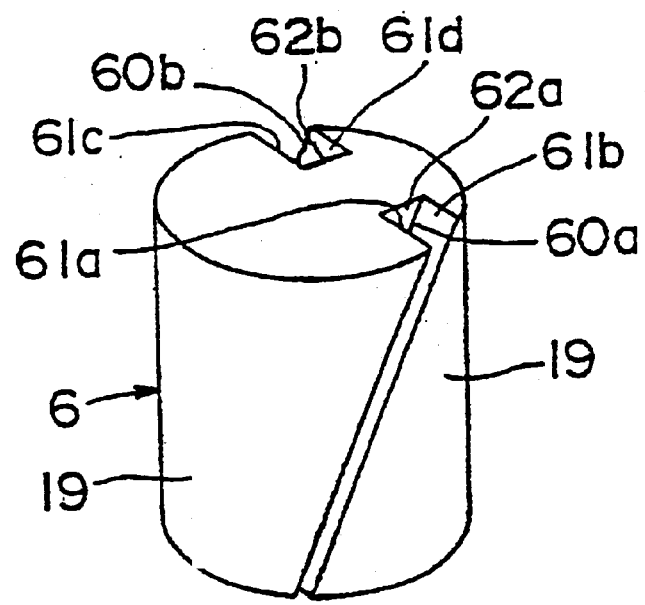
FIG. 16 is a pictorial view of the crank member inserted into the cylindrical body mounted in the third example of the stroke length adjusting device of this invention.

The crank member 6 is placed in the cylindrical body 4 in a mated state. As shown in FIG. 16, the crank member 6 has outer circumferential surface 19, which is part of a cylindrical rod coaxial to the axis of the cylindrical body and slidable on the inner surface of the cylindrical body 4, and first groove 60a and second groove 60b parallel to each other and formed on the circumference of the cylindrical rod over the one end to the other end of the cylindrical rod. The first groove 6a and second groove 60b are formed back-to-back with each other.

The first groove 60a of a recess shape is formed on the surface of the crank member and constituted by first slope 61a sloped at a predetermined angle to the central axis of the crank member 6, second slope 61b facing the first slope 61a and sloped parallel to the first slope, and first bottom surface 62a forming the bottom of the first groove 60a and rectangular to the first slope 61a and second slope 61b. In a cross-sectional view of the crank member 6 cut in the direction rectangular to the axis thereof, the edge line of the first slope 61a and the edge line of the first bottom surface 62a are rectangular to each other, the edge line of the second slope 61b and the first bottom surface 62a are rectangular to each other.

The second groove 60b of a recess shape is formed on the surface of the crank member and constituted by third slope 61c sloped at a predetermined angle to the central axis of the crank member 6, fourth slope 61d facing the third slope 61c and sloped parallel to the third slope, and second bottom surface 62b forming the bottom of the second groove 60b and rectangular to the third slope 61c and fourth slope 61d. In a cross-sectional view of the crank member 6 cut in the direction rectangular to the axis thereof, the edge line of the third slope 61c and the edge line of the second bottom surface 62b are rectangular to each other, the edge line of the fourth slope 61d and the second bottom surface 62b are rectangular to each other.

The first bottom surface 62a and second bottom surface 62b are formed parallel to each other and back-to-back with each other. In this example, the first slope 61a and third slope 61c are in the same sloped plane, and the second slope 61b and fourth slope 61d in the same sloped plane.

In this example, the first groove 60a and second groove 60b correspond to the cam guide referred to in this invention. More particularly, the first slope 61a and second slope 61b of the first groove 60a and the third slope 61c and fourth slope 61d of the second groove 60b constitute faces for transmitting the rotation force allowing the cam 7 to rotate by rotation of the crank member 6 as the cylindrical body 4 rotates about its central axis, and also constitute faces for transmitting the cam-traveling force allowing the cam 7 to eccentrically rotate on the plane rectangular to the central axis of the cylindrical body 4 as the crank member 6 travels in the cylindrical body 4.

In another view, the crank member 6 is constituted by a cylindrical rod formed to be slidable on the inner surface of the cylindrical body 4 and have a pair of first groove 60a and second groove 60b formed back-to-back with each other from one end to the other end of the cylindrical rod on the side surface of the cylindrical rod and sloped in a side view.

The crank member 6 is able to reciprocate in the cylindrical body 4 along the central axis thereof by the up-and-down movement-driving means 5, as in Example 1.

Figure 17:
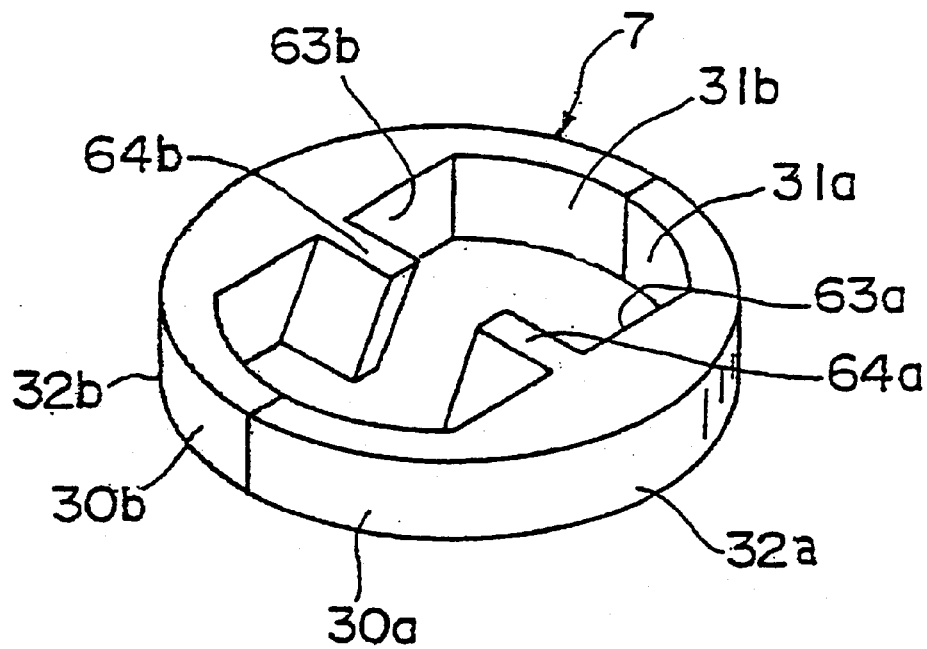
FIG. 17 is a pictorial view of the cam assembled in the cylindrical body and crank member mounted in the third example of the stroke length adjusting device of this invention.

The cam 7 has first cam element 30a and second cam element 30b, as shown in FIG. 17.

The first cam element 30a has first inner surface 31a which is part of a circle having a larger diameter than that of the cylindrical body 4 and formed when brought into contact with the second cam element 30b, first outer surface 32a corresponding to the first inner surface 31a, first guiding flat surface 63a mated into first opening 14a, and first sloped projection 64a projected at the first guiding flat surface 63a. Furthermore, the second cam element 30b has second inner surface 31b which is part of a circle having a larger diameter than that of the cylindrical body 4 and formed when brought into contact with the first cam element 30a, second outer surface 32b corresponding to the second inner surface 31b, second guiding flat surface 63b mated into second opening 14b, and second sloped projection 64b projected at the second guiding flat surface 63b.

Figure 18:
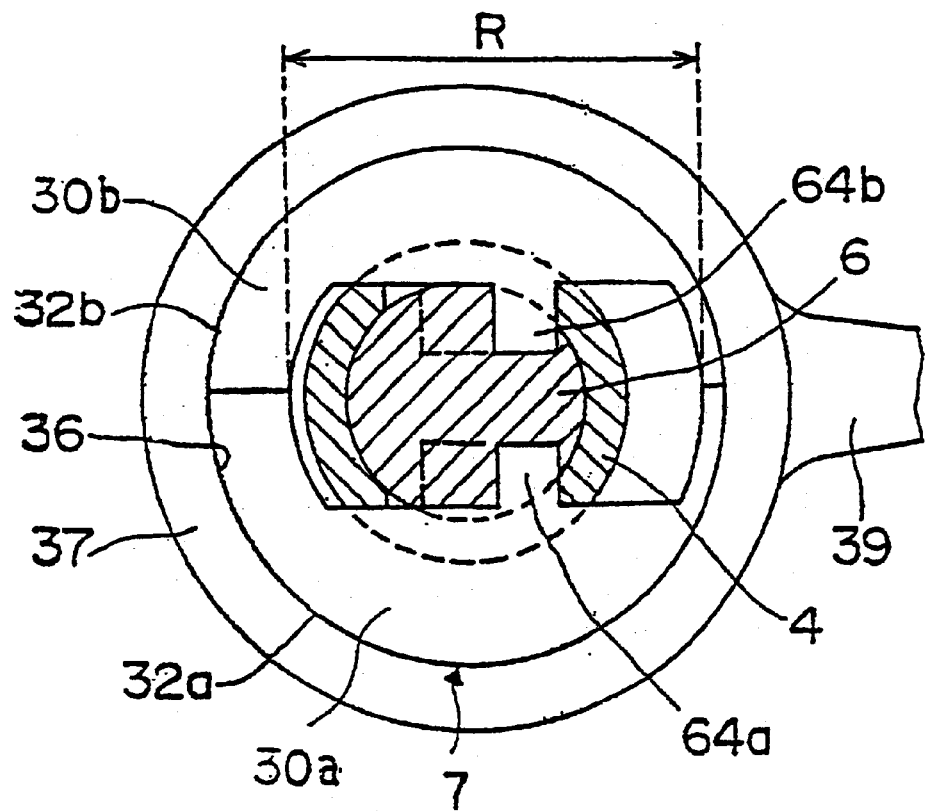
FIG. 18 is a plan view showing the cross section of the cylindrical body and crank member In an assembly of the cylindrical body, crank member and cam in the third example of the stroke length adjusting device of this invention.

The diameter of the first inner surface 31a of the first cam element 30a is identical with that of the second inner surface 31b of the second cam element 30b. As shown in FIG. 18, the diameter R of a pair of arcs facing each other and constituted by the inner surface 31a and second inner surface 31b when the first cam element 30a and second cam element 30b are brought in contact with each other, is so designed that, when the crank member 6 travels along its central axis thereof in the cylindrical body 4, the cylindrical body 4 can travel straight relatively with the crank member 6 in the plane rectangular to the central axis, and the cylindrical body 4 does not collide against the first inner surface 31a and second inner surface 31b in such a state that the first sloped projection 64a is mated in the first groove 60a of the cam 7 placed in the cylindrical body 4, and the second sloped projection 64b is mated in the second groove 60b.

The first guiding flat surface 63a and second guiding flat surface 63b are formed parallel to each other to face each other in the first cam element 30a and second cam element 3. The first guiding flat surface 63a and second guiding flat surface 63b guide the cam 7 so that the cam 7 travels straight in a plane rectangular to the central axis of the cylindrical body 4 as the crank member 6 travels along the central axis of the cylindrical body 4.

The first sloped projection 64a and second sloped projection 64b are mated in the first groove 60a and second groove 60b formed in the crank member 6, and allow the cam 7 to move straight in a plane rectangular to the central axis of the cylindrical body 4 as the crank member 6 travels in the cylindrical body 4. Therefore, the first sloped projection 64a and second sloped projection 64b have such a width that they can be mated in the first sloped projection 60a and second sloped projection 60b and are formed on an oblique plate sloped at the same angle of inclination as that of the first groove 60a and second groove 60b. Sliding of the first sloped projection 64a inside the first groove 60a allows the cam 7 to move straight. in other words, to eccentrically rotate. Thus, the first sloped projection 64a is to be guided by the first groove 60a. Similarly, the second sloped projection 64b is to be guided.

As shown in FIG. 18, the cam 7 is provided with a power-transmitting means for converting the eccentric rotation of the cam 7 to reciprocation, constituted by mounting means 37 with round opening 39 for mounting the cam 7, and connecting bar 39 connected to a piston inserted in a cylinder, as in Example 1.

In this example, a rotator rotates by rotation of a worm wheel in which the cylindrical body 4 is inserted and mated. The crank member 6 and cam 7 also rotate together with the rotator. The eccentric movement of the crank member 6 moved at a predetermined position by the up-and-down movement-driving means 5 allows the cam 7 to move eccentrically. As a result, the stroke length of the piston of the power-transmitting means is regulated depending upon the position of the crank member 6.

Figure 19:
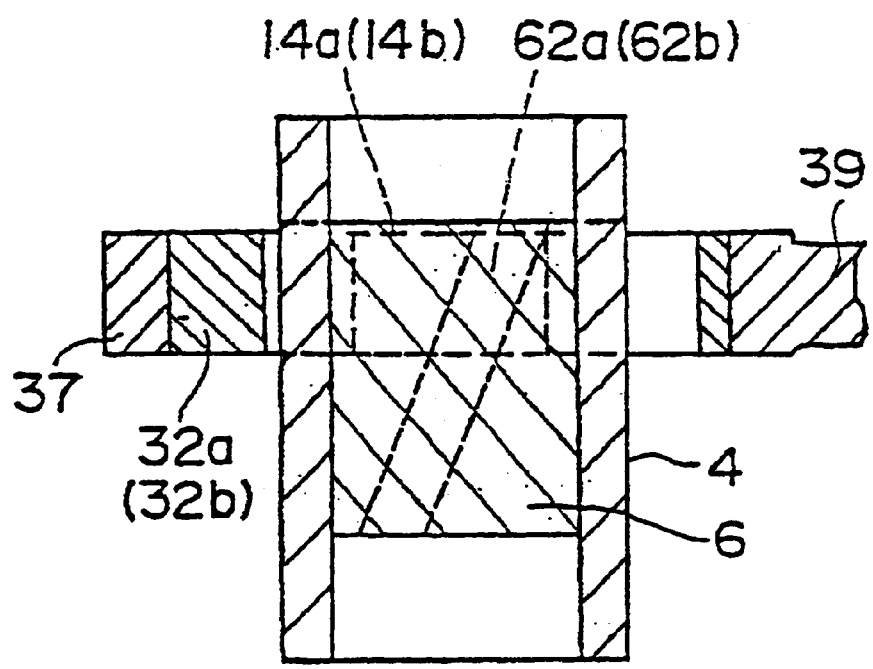
FIG. 19 is a cross-sectional view of an assembly of the cylindrical body, crank member and cam in the third example of the stroke length adjusting device of this invention.

Then, the same function as in Example 1 was made to disperse the load. Thus, to make the stroke length adjusting device compact according to this example was attained. FIG. 19 shows a state of the stroke length adjusting device of Example 3 in which the stroke length is 100%, as in Example 1.

Figure 21:
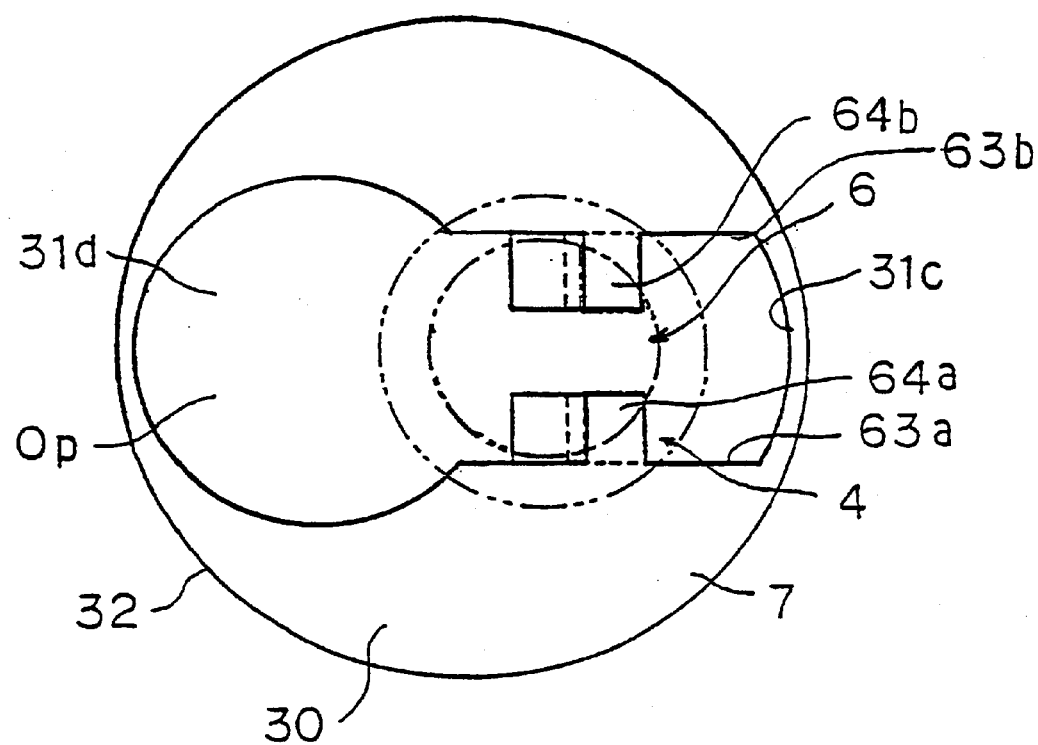
FIG. 21 is a further example of the cam used in the third example of the stroke length adjusting device of this invention. 1 . . . Stroke length adjusting device, 2 . . . Rotation-driving means, 3 . . . Holding means, 4 . . . Cylindrical body, 5 . . . Up-and-down movement-driving means, 6 . . . Crank member, 7 . . . Cam, 8 . . . Power-transmitting means, 9 . . . Oil-reservoir container, 10 . . . Opening, 11 . . . Lid, 12 . . . Sleeve, 13 . . . Installing means, 14 . . . Cylindrical body, 14$a$ . . . First opening, 14$b$ . . . Second opening, 14$c$ . . . Side wall of the first opening, 14$d$ . . . Side wall of the second opening, 15 . . . Wormwheel, 16 . . . Mounting hole, 17 . . . Key, 18 . . . Worm shaft, 19 . . . Outer surface, 20$a$ . . . First slope, 20$b$ . . . Second slope, 21 . . . Inner wall, 22$a$ . . . First recess. 22$b$ . . . Second recess, 23 . . . Shaft, 24 . . . Leading screw, 25 . . . Plug, 26 . . . Rod, 27 . . . Handle, 28 . . . Bearing, 29 . . . Nut, 30$a$ . . . First cam element, 30$b$ . . . Second cam element, 31$a$ . . . First inner surface, 31$b$ . . . Second inner surface, 31$c$ . . . Small inner surface, 31$d$ . . . Opening for inserting the cylindrical body therein, 32 . . . Outer surface, 32$a$ . . . First outer surface, 32$b$ . . . Second surface, 33$a$ . . . First projection, 33$b$ . . . Second projection, 34$a$ . . . First side surface, 34$b$ . . . Second side surface, 35$a$ . . . First slope end surface, 35$b$ . . . Second slope end surface, 36 . . . Mounting hole, 37 . . . Mounting member, 39 . . . Connecting rod, 40 . . . First outer surface, 41$a$, 41$b$ . . . Flat surfaces, 42 Base, 43 . . . Second surface, 44 . . . First sliding slope, 45 . . . Second sliding slope, 46 Projection, 48 . . . Opening, 49 . . . First groove, 50 . . . Second groove, 51$a$ . . . First semicircular circumference, 51$b$ . . . Second semicircular circumference, 52$a$ . . . First cutout for the first groove, 52$b$ . . . Second cutout for the first groove, 53$a$ . . . First cutout for the second groove, 53$b$ . . . Second cutout for the second groove, 54$a$ . . . First contact surface, 54$b$ . . . Second contact surface. 55$a$ . . . First rectangular small surface, 55$b$ . . . Second rectangular small surface, 56$a$ . . . First slope, 56$b$ . . . Second slope, 57$a$ . . . First rectangular large surface, 57$b$ . . . Second rectangular large surface, 58$a$ . . . First bottom surface, 58$b$ . . . Second bottom surface, 60$a$ . . . First groove, 60$b$ . . . Second groove, 61$a$ . . . First slope, 61$b$ . . . Second slope, 61$c$ . . . Third slope, 61$d$ . . . Fourth slope, 62$a$ . . . First bottom surface, 62$b$ . . . Second bottom surface, 63$a$ . . . First guiding flat surface, 63$b$ . . . Second guiding flat surface, 64$a$ . . . First projection, and 64$b$ . . . Second projection.

FIG. 21 show another example of the cam 7 used in the stroke length adjusting device of Example 3.

The cam 7 shown in FIG. 21 has a disk cam element 30. The cam element 30 1s provided with cylindrical body-mating opening Op for mating the cylindrical body 4. The cylindrical body-mating opening Op is in a key-hole flat form in the whole view, and at the other end is formed a small inner surface 31c which is part of a circle having a large diameter than that of the cylindrical body 4. First guiding flat surface 63a and second guiding flat surface 63b are formed to extend parallel to each other in the direction to the other end at a distance which is smaller than the diameter of the cylindrical body 4 and equal to or larger than the distance between the first opening 14a and the second opening 14b. The part at which the first opening 14a and second opening 14b of the cylindrical body 4 is mated between the first guiding flat surface 63a and second guiding flat surface 63b. The sidewall 14c of the first opening and side wall 14d of the second opening are applied to the first guiding flat surface 63a and second guiding flat surface 63b, respectively. At the first guiding flat surface 63a and second guiding flat surface 63b are projected the first sloped projection 64a and second sloped projection 64b, respectively. similar to those as shown in FIG. 17. The first guiding flat surface 63a and second guiding flat surface 63b follow the small inner surface 31c at the respective ends thereof.

At the end of the opening Op on the side opposite to the side on which the small inner surface 31c, is formed opening 31d for inserting the cylindrical body therein, which forms part of a circle having a larger inner diameter than that of the cylindrical body 4. Both the ends of the opening 31d for inserting the cylindrical body therein connect to the first guiding flat surface 63a and second guiding flat surface 63b, respectively, In the cam 7 as shown in FIG. 21, the cylindrical body 4 is inserted in the opening 31d for inserting the cylindrical body therein, and then the part at which the first opening 14a and second opening 14b of the cylindrical body 4 is mated between the first guiding flat surface 63a and second guiding flat surface 63b. This allows the cylindrical body 4 to be mounted in the cam 7. The stroke length adjusting device as in Example 3 with the cam as shown in FIG. 21 can more easily be assembled as compared with the adjusting devices with the cams as shown in FIGS. 17 and 18.

General Description

The foregoing describes the actual examples of this invention. This invention is not limited to these three examples, and may be modified as desired within the spirit of this invention.

For example, the cylindrical body is satisfied when it is provided with a function of allowing the crank member to be slidably placed in the cylindrical body, so that the crank member may be adjusted with the cam. Therefore, in order to mount the cam, the cylindrical body is provided on the circumferential surface thereof with openings. The shape and size of the openings vary depending upon the shape of the crank member mated or placed in the cylindrical body.

The cylindrical body, as shown in FIGS. 1 and 2, is not needed to be arranged so that the central axis thereof may be vertical. For any reason, the cylindrical body may be arranged in the stroke length adjusting device so as to put the central axis of the cylindrical body horizontally or obliquely. When the cylindrical body is not put vertically in the axial direction, a liquid-tight means such as an O-ring or packing may be needed in order to prevent leaking of a lubricant contained at the reciprocation-driving means-mounted position.

The crank member is, as placed in the cylindrical body and provided with the cam, constituted by a cam-guide formed so that the cam may rotate eccentrically as the crank member travels in the cylindrical body, and an outer surface slidable on the inner surface of the cylindrical body. More definitely and preferably, the crank member is, as placed in the cylindrical body and provided with the cam, constituted by a cam-guide having a rotation force-transmitting surface for transmitting a rotation force to the crank member as the cylindrical body rotates about its central axis, and a cam-traveling force-transmitting surface for transmitting a force for allowing the cam to rotate eccentrically as the crank member travels in the cylindrical body, in other words, a force for allowing the cam to travel in the direction rectangular to the central axis of the cylindrical body, and an outer circumferential surface for transmitting the load and torque by the crank member as the cylindrical body and crank member rotate, to the cylindrical body.

In the cam 7 as shown in Example 1, the rotation force-transmitting surface is first side surface 34a of the first projection 33a and second side surface 34b of the second projection 33b. The cam-traveling force-transmitting surface is first slope 22a and second slope 22b of the first recess 22a of the crank member 6. The outer circumferential surface is outer circumferential surface 19. In the cam 7 as shown in Example 2, the rotation force-transmitting surface is flat surfaces 41a and 41b of the base 42. The cam-traveling force-transmitting surface is first sliding slope 44 and second sliding slope 45 of the projection 46. Furthermore, the outer circumferential surface is the outer surfaces of the base 42 and projection 46.

The rotation force-transmitting surface may be in any shape, as far as the cam is allowed to eccentrically rotate in a plane rectangular to the rotation central axis of the cylindrical body, as the crank member rotates with rotation of the cylindrical body about its central axis. The preferred shape is normally a flat shape, which may have grooves.

On the other hand, the cam-traveling force transmitting surface may be not only in a flat shape, but also in a rectangular recess shape, V-shape, grooved flat shapes U-shape or corrugated shape.

In this invention, the crank member may be formed in such a manner that the first projection and second projection are provided at the slope end surfaces thereof to be mated into the first recess and second recess and face the first slope and second slope, with balls or rollers which allow the end surfaces of the first projection and second projection to roll over the first slope and second slope.

In the stroke length adjusting devices in FIGS. 1 and 2, the crank member of this invention may be provided both on both the ends thereof with cylindrical rods, if it does not matter if they are in so large a size that does not damage the practical use of them.

Advantages of This Invention

In accordance with this invention, there can be provided a stroke length adjusting device having a simple structure. In accordance with this invention, there can be provided a stroke length adjusting device having a small size than that of the conventional adjusting devices. In accordance with this invention, there can be provided a stroke length adjusting device constituted by a smaller number of elements than those of the conventional adjusting devices and, hence, more easily assembled. In accordance with this invention, there can be provided a sound stroke length adjusting device which is enough to withstand the torque generated by the movement of the cam.

The stroke length adjusting device of this invention has no such N-shaped crank as conventionally used and constituted by a pair of cylindrical rods and a pin obliquely provided between the ends of the cylindrical ends facing each other. In other words, this allows the stroke length adjusting device of this invention to be miniaturized.

In accordance with this invention, there is provided a cylindrical body for containing a crank member therein, the crank member having an outer circumferential surface sliding on the inner circumferential surface of the cylindrical body. Therefore, the torque or load generated in allowing the crank member to rotate by rotation of the cylindrical body is dispersed over the cylindrical body. Accordingly, the adjusting device of this invention needs no thick holding member for supporting the N-shaped crank member as in the prior art.

What is claimed is:

1. A stroke length adjusting device, characterized by comprising a cylindrical body allowed by a rotation-driving means to rotate and rotatably supported by a supporting means, a crank member mated in the cylindrical body and allowed by a reciprocally moving means to travel in the cylindrical body in the direction of its central axis, a cam placed in the crank member, and a power-transmitting means for converting the eccentric rotation of the cam to reciprocation.

the crank member being provided with groove-shaped cam guides inclined at a predetermined angle to the central axis of the cylindrical body, thereby allowing the cam to be made eccentric when the crank member travels along the central axis of the cylindrical body through the reciprocating motion means, and an outer surface in contact with the inner surface of the cylindrical body, and the cam being placed In the cylindrical body at the outside thereof in the direction rectangular to the central axis of the cylindrical body, and having a means to be guided by the cam-guides to move.

2. A stroke length Adjusting device, characterized by comprising a cylindrical body allowed by a rotation-driving means to rotate and rotatably supported by a supporting means, a crank member mated in the cylindrical body and allowed by a reciprocally moving means to travel in the cylindrical body in the direction of its central axis, a cam placed in the crank member, and a power-transmitting means for converting the eccentric rotation of the cam to reciprocation, the crank member being provided with a first recess comprising a first slope inclined at a predetermined angle to the central axis of the cylindrical body and inner wall surfaces facing each other, a second recess comprising a second slope inclined at the same angle and formed back-to-back with the first recess and inner wall surfaces facing each other, and an outer surface, the cylindrical body being provided with an inner surface in contact with the outer surface of the crank member, a first opening having the same width as that of the first recess and opened so as to face the first recess, and a second opening having the same width as that of the second recess and opened so as to face the second recess, and the cam being provided with a first projection to be inserted into the first opening in a mated state and having a slope end surface slidable on the first slope, and a second projection to be inserted into the second opening in a mated state and having a slope end surface slidable on the second slope, and placed in the cylindrical body at the outside thereof.

3. A stroke length Adjusting device, characterized by comprising a cylindrical body allowed by a rotation-driving means to rotate and rotatably supported by a supporting means, a crank member mated in the cylindrical body and allowed by a reciprocally moving means to travel in the cylindrical body in the direction of its central axis, a cam placed in the crank member, and a power-transmitting means for converting the eccentric rotation of the cam to reciprocation, the crank member being provided with a base having a pair of first outer surfaces which are formed to face to the directions opposite to each other and slidable on the pair of the first outer surfaces, and a pair of projections projected on each of the flat surfaces, each projection having a second inner surface sliding on the inner surface of the cylindrical body, a first sliding slope inclined at a predetermined angle to the central axis of the cylindrical body and a second sliding slope inclined at the same angle as the predetermined angle and formed back-to-back with the first sliding slope, the cylindrical body being provided with the inner surface on which the first outer surfaces and second outer surfaces are slidable, and a pair of a first opening and second opening both having the same width as that of the pair of the flat surfaces, and the cam being inserted in the first opening at the outside of the cylindrical body in a tightly mated state, and having a first groove allowing the projections to be slidable thereon as the crank member traveling through the cylindrical body and a second groove allowing the base of the crank member eccentrically rotating as the cylindrical body rotates to travel therethrough.

4. A stroke length adjusting device, characterized by comprising a cylindrical body allowed by a rotation-driving means to rotate and rotatably supported by a supporting means, a crank member mated in the cylindrical body and allowed by a reciprocally-moving means to travel in the cylindrical body in the direction of its central axis, a cam placed in the crank member, and a power-transmitting means for converting the eccentric rotation of the cam to reciprocation, the crank member being a cylindrical rod sliding on the inner surface of the cylindrical body, on the outer surface of which rod is provided with a first groove inclined at a predetermined angle to the central axis of the cylindrical body and a second groove formed back-to-back with the first groove, the cylindrical body having an inner surface in contact with the outer surface of the crank member, which is provided thereon with a first opening and second opening for mounting the cam therein, and the cam being provided with a first projection and second projection inserted in the first opening and second opening, respectively, in a mated state, and placed in the cylindrical body at the outside thereof.

* * * * *